US012676098B2

(12) United States Patent
Liu et al.

(10) Patent No.: US 12,676,098 B2
(45) Date of Patent: Jul. 7, 2026

(54) DISPLAY PANEL AND DISPLAY DEVICE

(71) Applicant: SeeYA Optronics Co., Ltd., Shanghai (CN)

(72) Inventors: Ping-Lin Liu, Shanghai (CN); Tong Wu, Shanghai (CN)

(73) Assignee: SeeYA Optronics Co., Ltd., Shanghai (CN)

( * ) Notice: Subject to any disclaimer, the term of this patent is extended or adjusted under 35 U.S.C. 154(b) by 0 days.

(21) Appl. No.: 19/171,002

(22) Filed: Apr. 4, 2025

(65) Prior Publication Data

US 2025/0316205 A1 Oct. 9, 2025

(30) Foreign Application Priority Data

Apr. 7, 2024 (CN) ......................... 202410411149.2

(51) Int. Cl.
*G09G 3/20* (2006.01)

(52) U.S. Cl.
CPC ... *G09G 3/2092* (2013.01); *G09G 2310/0267* (2013.01); *G09G 2310/0286* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2025/0054445 A1* 2/2025 Yuan .................... G09G 3/3266

FOREIGN PATENT DOCUMENTS

| | | | |
|---|---|---|---|
| CN | 114170943 | A | 3/2022 |
| CN | 117116198 | A | 11/2023 |
| CN | 117334237 | A | 1/2024 |

OTHER PUBLICATIONS

Chinese Notice of Invention Patent Right Grant, dated Aug. 11, 2025, in connection with Chinese Application No. 202410411149.2, with English translation thereof.

* cited by examiner

*Primary Examiner* — Ifedayo B Iluyomade

(74) *Attorney, Agent, or Firm* — Wolf, Greenfield & Sacks, P.C.

(57) ABSTRACT

A display panel includes pixels and a driver circuit. The driver circuit includes shift register units and switch modules. Each switch module includes N switch units turned on in a time-sharing manner. A signal input terminal of an M-th-stage shift register unit is electrically connected to a start control signal terminal through any one of an M-th switch unit to an N-th switch unit; and the signal input terminal of the M-th-stage shift register unit is electrically connected to a signal output terminal of at least one of a first-stage to an (M−1)-th-stage shift register unit through a first to an (M−1)-th switch unit. A signal input terminal of an (I+N)-th-stage shift register unit is electrically connected to a signal output terminal of at least one of an I-th-stage to an (I+N−1)-th-stage shift register unit through the N switch units.

11 Claims, 18 Drawing Sheets

DISPLAY PANEL AND DISPLAY DEVICE

CROSS REFERENCE TO RELATED APPLICATION

This application claims the priority to Chinese Patent Application No. CN202410411149.2, filed on Apr. 7, 2024, the disclosure of which is incorporated herein by reference in its entirety.

TECHNICAL FIELD

Embodiments of the present application relate to the field of display technology and, in particular, to a display panel and a display device.

BACKGROUND

With the development of display technology, the requirements for display devices are increasingly high. For example, factors such as low power consumption, low cost, and high display quality have gradually become important criteria for evaluating the performance of display devices. The core of a display device is a display panel. Therefore, the control of the display quality, cost, and power consumption of the display panel is key to enhancing the performance of the display device.

A display panel typically includes multiple pixels arranged in an array and a driver circuit for driving pixels to emit light for display. The driver circuit includes multiple shift register units connected in cascade. A start control signal is supplied to a first-stage shift register unit so that shift register units can output effective levels of gate driving signal sequentially to perform progressive scanning on rows of pixels and supply data signals to the rows of pixels sequentially, thereby enabling the rows of pixels to emit light for display according to the received data signals.

However, in some application scenarios, images presented in different display regions of the display panel require different display resolutions. The existing driver circuit cannot meet the differentiated display requirements of the display panel so that the display panel fails to achieve the performance of low power consumption, low cost, and high display quality.

SUMMARY

Embodiments of the present application provide a display panel and a display device so that a driver circuit in the display panel can meet the diverse display requirements, enabling the display panel to have the performance of low power consumption, low cost, and high display quality.

Embodiments of the present application provide a display panel. The display panel includes pixels arranged in an array and a driver circuit.

The driver circuit includes shift register units connected in cascade and switch modules, where each switch module is electrically connected to a respective one of shift register units other than a first-stage shift register unit. A signal output terminal of each shift register unit of the shift register units is connected to a respective row of pixels among the pixels.

Among the switch modules, each switch module includes N switch units. The N switch units are a first switch unit, . . . , and an N-th switch unit, respectively. N switch units of one switch module are turned on in a time-sharing manner. N is a positive integer greater than or equal to 2.

Among the shift register units, a signal input terminal of the first-stage shift register unit is electrically connected to a start control signal terminal. For each shift register unit of the shift register units other than the first-stage shift register unit, a signal input terminal of the shift register unit is correspondingly electrically connected to switch output terminals of N switch units of the respective switch module.

Among first N-stage shift register units, a signal input terminal of an M-th-stage shift register unit is electrically connected to the start control signal terminal through any one of an M-th switch unit and an N-th switch unit of a switch module corresponding to the M-th-stage shift register unit; and the signal input terminal of the M-th-stage shift register unit is electrically connected to a signal output terminal of at least one of the first-stage shift register unit to an (M−1)-th-stage shift register unit through a first switch unit to an (M−1)-th switch unit of the switch module corresponding to the M-th-stage shift register unit. M is a positive integer greater than 1 and less than or equal to N.

A signal input terminal of an (I+N)-th-stage shift register unit is electrically connected to a signal output terminal of at least one of an I-th-stage shift register unit to an (I+N−1)-th-stage shift register unit through the N switch units of a switching module corresponding to the (I+N)-th-stage shift register unit. I is a positive integer greater than 1.

Embodiments of the present application further provide a display device including the preceding display panel.

DETAILED DESCRIPTION

To make the objects, technical solutions, and advantages of the present application clearer, the technical solutions of the present application will be described completely below in conjunction with the drawings in embodiments of the present application and specific implementations. Apparently, the embodiments described below are part, not all, of the embodiments of the present application. It is apparent for those skilled in the art that various modifications and variations may be made in the present application without departing from the spirit or scope of the present application. Therefore, the present application is intended to cover modifications and variations of the present application that fall within the scope of the corresponding claims (the claimed technical solutions) and equivalents thereof.

Moreover, the terms "first", "second", and the like in the present application are used for distinguishing between different components but not used for describing any order, quantity, or significance. Similarly, the term "one", "a", "the" or the like does not mean a quantitative limit, but indicates the existence of at least one. The term "including", "comprising" or the like means that the elements or objects in front of the term cover elements or objects and their equivalents listed in the back of the term, but do not exclude other elements or objects. The term "connect", "connected to" or the like is not limited to physical or mechanical connections, but may include electrical connections, whether it is direct or indirect. "On", "below", "left", "right" and the like are merely utilized to indicate the relative positional relationship, and when the absolute position of the described object is changed, the relative positional relationship may also change accordingly. In addition, the description of being the same and equal involved in embodiments of the present disclosure does not indicate that two objects are completely equal in size and the same in shape. The two objects are allowed to be approximately the same or approximately equal within a certain error range.

It is to be noted that if not in collision, embodiments of the present application may be combined with each other.

Figure 1:
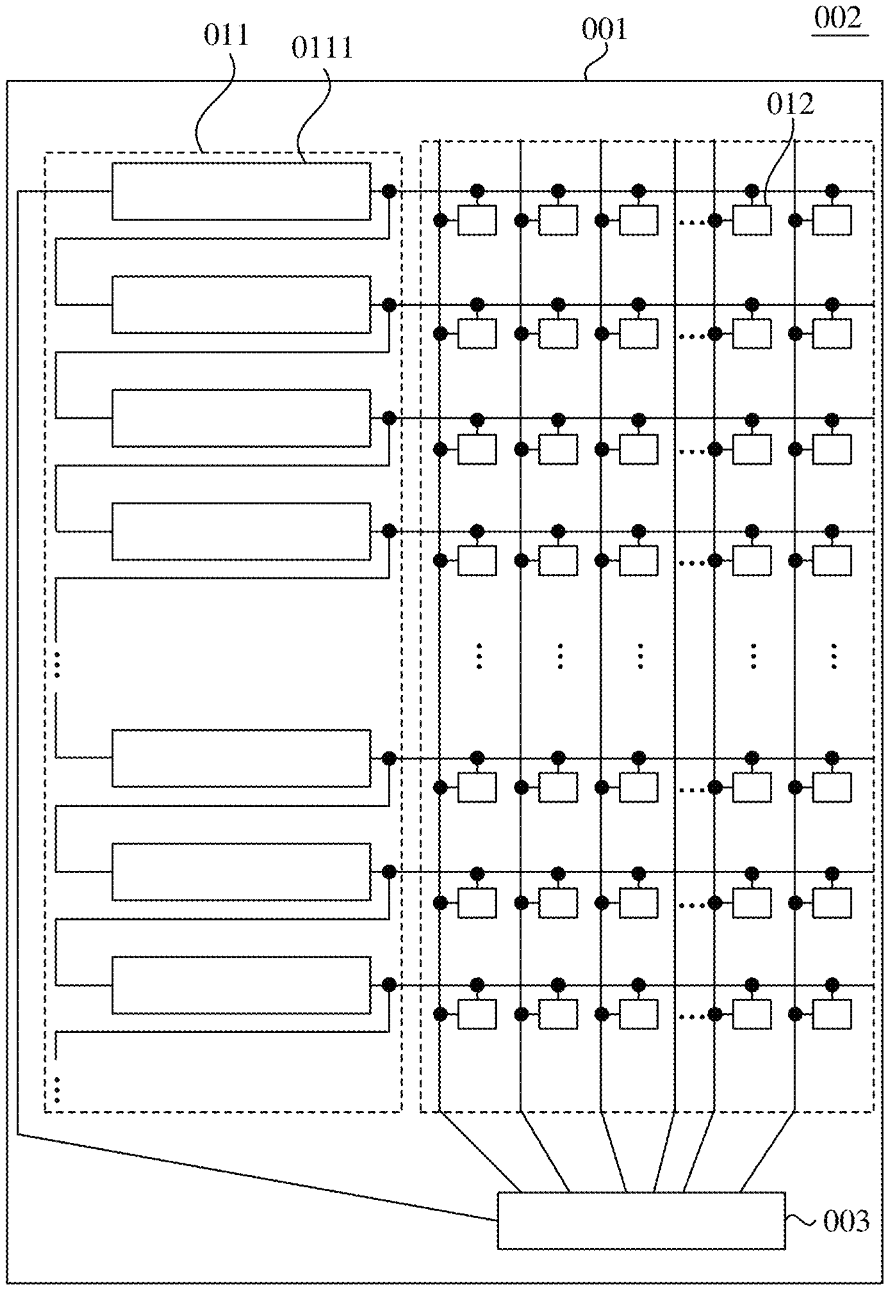
FIG. 1 is a structural diagram of a display device according to an embodiment of the present application.

FIG. 1 is a structural diagram of a display device according to an embodiment of the present application. As shown in FIG. 1, the display device 002 may include a display panel 001 and a display driver chip 003 disposed in the display panel 001. The display panel 001 may include a driver circuit 011 and multiple pixels 012 arranged in an array. The display driver chip 003 supplies corresponding control signals to the driver circuit 011 to drive each row of pixels 012 through a respective shift register unit 0111 of the driver circuit 011, so that data signals supplied by the display driver chip 003 can be written to each row of pixels 012, thereby controlling each row of pixels 012 to emit light for display and enabling the display panel 001 to present a corresponding display image.

When the display device is a virtual reality (VR)/augmented reality (AR) display device, the foveated rendering technology is usually applied to alleviate the problem of dizziness caused by using the VR/AR display device. That is, a high-resolution display region and a low-resolution or medium-low-resolution display region are determined according to the focused region of the user's eyes by simulating the vision of a user, and data signals supplied to each row of pixels 012 are controlled based on the display driver chip 003, thereby controlling display resolutions of different display regions. In this case, the implementation of the foveated rendering technology relies completely on the display driver chip 003, requiring the display driver chip 003 to have a complex internal circuit structure and complex logic operation ability. Therefore, the display driver chip 003 has a relatively large size and relatively high power consumption, which is not conducive to the low power consumption and low cost of the display device.

Additionally, when the display panel 001 displays an image, the shift register units 0111 of the driver circuit 011 in the display panel 001 may output effective levels of gate driving signals sequentially to perform progressive scanning on rows of pixels 012. Such a scanning manner cannot meet the requirements of different display regions on different display resolutions in the foveated rendering technology, thereby not conducive to the low power consumption and low cost of the display panel.

To solve the preceding technical problem, embodiments of the present application provide a display panel. The display panel includes pixels arranged in an array and a driver circuit. The driver circuit includes shift register units connected in cascade and switch modules, where each switch module is electrically connected to a respective one of shift register units other than a first-stage shift register unit. The signal output terminal of each shift register unit is correspondingly connected to the respective row of pixels. Each switch module includes N switch units. The N switch units are a first switch unit, . . . , and an N-th switch unit, respectively. Switch units of the same switch module are turned on in a time-sharing manner. N is a positive integer greater than or equal to 2. The signal input terminal of the first-stage shift register unit is electrically connected to a start control signal terminal. For each shift register unit of the shift register units other than the first-stage shift register unit, a signal input terminal of the shift register unit is correspondingly electrically connected to switch output terminals of switch units of the respective switch module. Among first N-stage shift register units, a signal input terminal of an M-th-stage shift register unit is electrically connected to the start control signal terminal through any one of an M-th switch unit to an N-th switch unit of a switch module corresponding to the M-th-stage shift register unit; and the signal input terminal of the M-th-stage shift register unit is also electrically connected to the signal output terminal of at least one of the first-stage shift register unit to an (M−1)-th-stage shift register unit through a first switch unit to an (M−1)-th switch unit of the switch module corresponding to the M-th-stage shift register unit. M is a positive integer greater than 1 and less than or equal to N. A signal input terminal of an (I+N)-th-stage shift register unit is electrically connected to the signal output terminal of at least one of an I-th-stage shift register unit to an (I+N−1)-th-stage shift register unit through switch units of a switching module corresponding to the (I+N)-th-stage shift register unit. I is a positive integer greater than 1.

In the preceding technical solutions, switch modules corresponding to the shift register units other than the first-stage shift register unit are disposed in the driver circuit, and each switch module includes N switch units. In this case, for each shift register unit of the shift register units other than the first-stage shift register unit, the signal input terminal of the shift register unit is electrically connected to switch units in the same switch module. Among first N-stage shift register units, the signal input terminal of an M-th-stage shift register unit is electrically connected to a start control signal terminal through any one of an M-th switch unit to an N-th switch unit of a switch module corresponding to the M-th-stage shift register unit; and the signal input terminal of an M-th-stage shift register unit is also electrically connected to the signal output terminal of at least one of a first-stage shift register unit to an (M−1)-th-stage shift register unit through a first switch unit to an (M−1)-th switch unit of the switch module corresponding to the M-th-stage shift register unit. The signal input terminal of an (I+N)-th-stage shift register unit is electrically connected to the signal output terminal of at least one of an I-th-stage shift register unit to an (I+N−1)-th-stage shift register unit through switch units of a switching module corresponding to the (I+N)-th-stage shift register unit. With this arrangement, the signal input terminal of a shift register unit other than the first-stage shift register unit may receive at least one input signal. Moreover, input signals received by signal input terminals of shift register units can be selectively controlled by controlling the state of switch units electrically connected to shift register units, thereby controlling the time of effective levels of gate driving signals output by signal output terminals of shift register units. In this case, the driver circuit can meet diverse driving requirements, thereby enabling the display panel to achieve the performance of low power consumption, low cost, and high display quality.

The preceding is a core idea of the present application. Based on embodiments of the present application, all other embodiments obtained by those of ordinary skill in the art are within the scope of the present application on the premise that no creative work is done. Technical solutions of embodiments of the present application are described clearly and completely hereinafter in conjunction with the drawings in embodiments of the present application.

Figure 2:
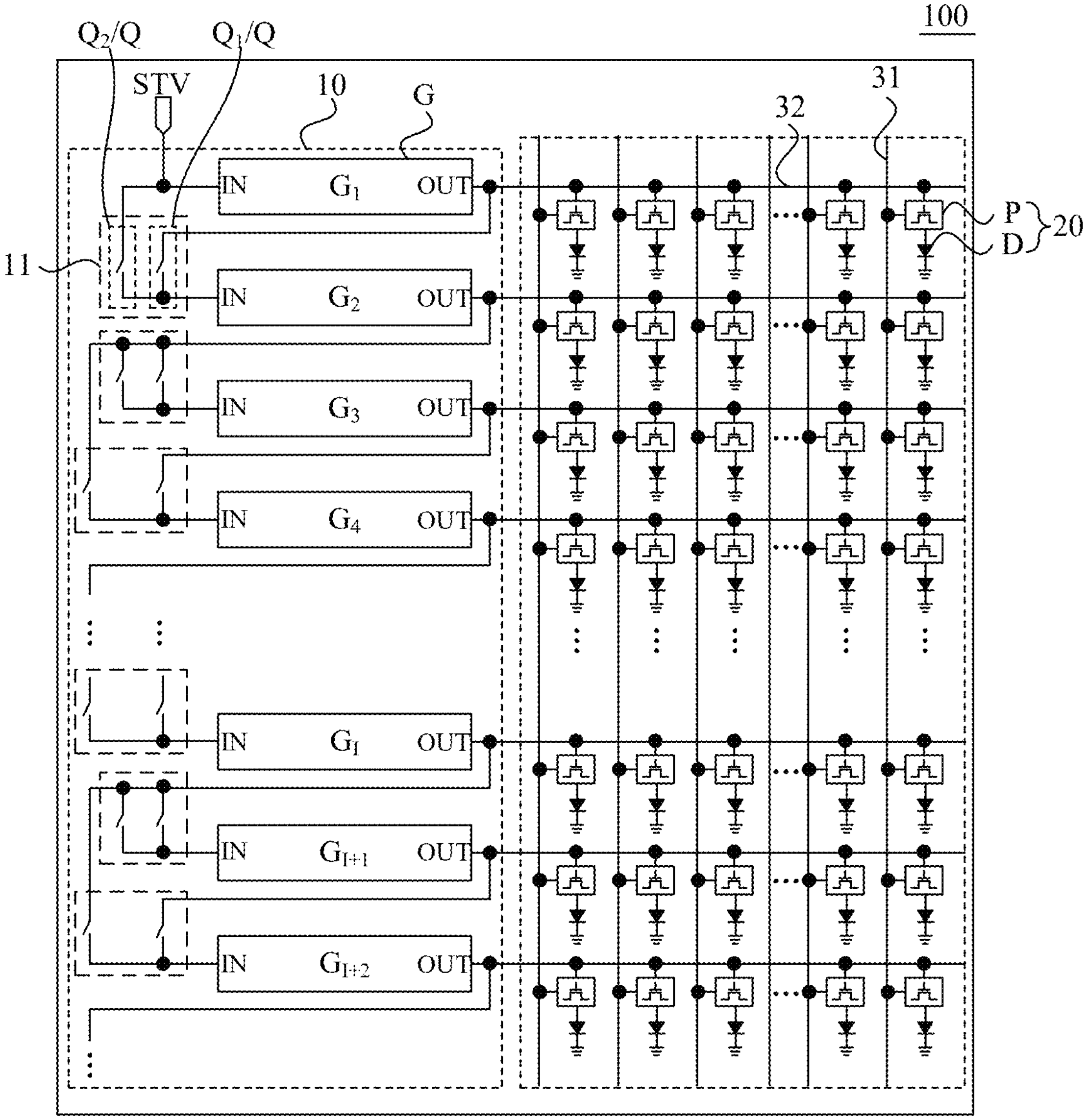
FIG. 2 is a structural diagram of a display panel according to an embodiment of the present application.

FIG. 2 is a structural diagram of a display panel according to an embodiment of the present application. As shown in FIG. 2, the display panel 100 includes a driver circuit 10 and pixels 20 arranged in an array. The driver circuit 10 includes shift register units G connected in cascade. Signal output terminal OUT of each shift register unit G is correspondingly connected to a respective row of pixels 20.

A pixel 20 may include a pixel circuit P and a light-emitting element D. The pixel circuit P may include at least one of an active component or a passive component. The active component may include, for example, a transistor. The passive component may include, for example, a resistor, a capacitor, or an inductor. For ease of description, in embodiments of the present application, an example in which the pixel circuit P is replaced with one transistor is taken for exemplarily describing technical solutions of embodiments of the present application.

Signal output terminal OUT of a shift register unit G in the driver circuit 10 is connected to a corresponding row of pixels 20 to supply gate driving signal to the corresponding row of pixels 20 to control transistors of pixel circuits P in the corresponding row of pixels 20 to be turned on or off. Moreover, when the transistors in the pixel circuits P are turned on, the data signal can be controlled to be written to the pixel circuits P so that the pixel circuits P can drive light-emitting elements D to emit light based on the written data signal. The display brightness of the light-emitting elements D is related to the voltage of the data signal. The combination of light emitted by the light-emitting elements D with different brightness levels and/or colors can present a colorful image.

It is to be understood that how signal output terminals OUT of shift register units G in the driver circuit 10 are connected to corresponding rows of pixels 20 may be set according to actual requirements, which is not specifically limited in embodiments of the present application. In an optional embodiment, the display panel 100 may further include multiple scan lines 32 and multiple data lines 31. At least part of the pixels 20 in the same row may be electrically connected to the same scan line 32. At least part of the pixels 20 in the same column may be electrically connected to the same data line 31. A signal output terminal of a shift register unit G may be electrically connected to one scan line 32 so that the gate driving signal output by the signal output terminal OUT of the shift register unit G can be transmitted to the corresponding row of pixels 20 through the scan line 32, thereby allowing the data signal transmitted by the data line 31 to be written to the corresponding row of pixels 20.

Continuing to refer to FIG. 2, the driver circuit 10 may further include switch modules 11 correspondingly electrically connected to the shift register units G. Each switch module 11 includes N switch units Q. The N switch units Q are a first switch unit $Q_1$, . . . , and an N-th switch unit $Q_N$, respectively. Switch units Q of the same switch module 11 are turned on in a time-sharing manner. N is a positive integer greater than or equal to 2. The signal input terminal IN of the first-stage shift register unit $G_1$ is electrically connected to the start control signal terminal STV. For each shift register unit of shift register units other than the first-stage shift register unit, the signal input terminal IN of the shift register unit G is electrically connected to switch output terminals of switch units Q of the switch module 11 corresponding to the shift register unit G. Among first N-stage shift register units, the signal input terminal IN of the M-th-stage shift register unit $G_M$ is electrically connected to the start control signal terminal STV through any one of an M-th switch unit $Q_M$ to an N-th switch unit $Q_N$ of the switch module corresponding to the M-th-stage shift register unit $G_M$; and the signal input terminal IN of the M-th-stage shift register unit $G_M$ is also electrically connected to the signal output terminal OUT of at least one of the first-stage shift register unit $G_1$ to an (M−1)-th-stage shift register unit $G_{M-1}$ through a first switch unit $Q_1$ to an (M−1)-th switch unit $Q_{M-1}$ of the switching module corresponding to the M-th-stage shift register unit $G_M$. The signal input terminal IN of the (I+N)-th-stage shift register unit $G_{I+N}$ is electrically connected to the signal output terminal OUT of at least one of an I-th-stage shift register unit $G_I$ to an (I+N−1)-th-stage shift register unit $G_{I+N-1}$ through switch units Q of the switching module corresponding to the (I+N)-th-stage shift register unit $G_{I+N}$. M is a positive integer greater than 1 and less than or equal to N. I is a positive integer greater than 1.

Optionally, a shift register unit G may include a signal input terminal IN and a signal output terminal OUT. A switch unit Q may include a switch input terminal and a switch output terminal. The switch output terminal of the switch unit Q may be electrically connected to the signal input terminal IN of the I-th-stage shift register unit Gr. The switch input terminal of the switch unit Q may be electrically connected to the start control signal terminal STV or the signal output terminal OUT of one of the first-stage shift register unit $G_1$ to an (I−1)-th-stage shift register unit G. In this case, when the switch unit Q is turned on, a start control signal stv of the start control signal terminal STV or a gate driving signal Gout output by the signal output terminal OUT of one of the first-stage shift register unit $G_1$ to the (I−1)-th-stage shift register unit G can be transmitted to the signal input terminal IN of the I-th-stage shift register unit $G_I$ and serves as an input signal of the I-th-stage shift register unit $G_I$ to control the time when the signal output terminal OUT of the I-th-stage shift register unit $G_I$ outputs the effective level of a gate driving signal $Gout_I$.

Exemplarily, as shown in FIG. 2, by way of example, N=2. The signal input terminal IN of the first-stage shift register unit $G_1$ is electrically connected to the start control signal terminal STV so that the first-stage shift register unit $G_1$ can receive the start control signal stv of the start control signal terminal STV. In this case, a corresponding gate driving signal $Gout_1$ is output under the control of the start control signal stv. In a switch module 11 correspondingly connected to a second-stage shift register unit $G_2$, the switch input terminal of the first switch unit $Q_1$ is electrically connected to the signal output terminal OUT of the first-stage shift register unit $G_1$, the switch output terminal of the first switch unit $Q_1$ is electrically connected to the signal input terminal IN of the second-stage shift register unit $G_2$, the switch input terminal of the second switch unit $Q_2$ is electrically connected to the start control signal terminal STV, and the switch output terminal of the second switch unit $Q_2$ is electrically connected to the signal input terminal IN of the second-stage shift register unit $G_2$. In this case, when the first switch unit $Q_1$ is turned on, the gate driving signal $Gout_1$ output by the first-stage shift register unit $G_1$ may serve as an input signal of the second-stage shift register unit $G_2$. When the second switch unit $Q_2$ is turned on, the start control signal stv of the start control signal terminal STV may serve as an input signal of the second-stage shift register unit $G_2$.

Correspondingly, in a switch module 11 correspondingly connected to a third-stage shift register unit $G_3$, the switch input terminal of the first switch unit $Q_1$ and the switch input terminal of the second switch unit $Q_2$ are both electrically connected to the signal output terminal OUT of the second-stage shift register unit $G_2$, and the switch output terminal of the first switch unit $Q_1$ and the switch output terminal of the second switch unit $Q_2$ are both electrically connected to the signal input terminal IN of the third-stage shift register unit $G_3$. In this case, when the first switch unit $Q_1$ or the second switch unit $Q_2$ is turned on, a gate driving signal $Gout_2$ output by the signal output terminal OUT of the second-stage shift register unit $G_2$ may serve as an input signal of the third-stage shift register unit $G_3$. In a switch module 11 correspondingly connected to a fourth-stage shift register unit $G_4$, the switch input terminal of the first switch unit $Q_1$ is electrically connected to the signal output terminal OUT of the third-stage shift register unit $G_3$, the switch output terminal of the first switch unit $Q_1$ is electrically connected to the signal input terminal IN of the fourth-stage shift register unit $G_4$, the switch input terminal of the second switch unit $Q_2$ is electrically connected to the signal output terminal OUT of the second-stage shift register unit $G_2$, and the switch output terminal of the second switch unit $Q_2$ is electrically connected to the signal input terminal IN of the fourth-stage shift register unit $G_4$. In this case, when the first switch unit $Q_1$ is turned on, a gate driving signal $Gout_3$ output by the third-stage shift register unit $G_3$ may serve as an input signal of the fourth-stage shift register unit $G_4$. When the second switch unit $Q_2$ is turned on, the gate driving signal $Gout_2$ output by the second-stage shift register unit $G_2$ may serve as an input signal of the fourth-stage shift register unit $G_4$. The rest can be done in the same way. In a switch module 11 correspondingly connected to an (I+2)-th-stage shift register unit $G_{I+2}$, the switch input terminal of the first switch unit $Q_1$ is electrically connected to the signal output terminal OUT of an (I+1)-th-stage shift register unit $G_{I+1}$, the switch output terminal of the first switch unit $Q_1$ is electrically connected to the signal input terminal IN of the (I+2)-th-stage shift register unit $G_{I+2}$, the switch input terminal of the second switch unit $Q_2$ is electrically connected to the signal output terminal OUT of the I-th-stage shift register unit $G_I$, and the switch output terminal of the second switch unit $Q_2$ is electrically connected to the signal input terminal IN of the (I+2)-th-stage shift register unit $G_{I+2}$. In this case, when the first switch unit $Q_1$ is turned on, a gate driving signal $Gout_{I+1}$ output by the (I+1)-th-stage shift register unit $G_{I+1}$ may serve as an input signal of the (I+2)-th-stage shift register unit $G_{I+2}$. When the second switch unit $Q_2$ is turned on, the gate driving signal $Gout_1$ output by the I-th-stage shift register unit $G_I$ may serve as an input signal of the (I+2)-th-stage shift register unit $G_{I+2}$. With this arrangement, for each shift register unit G, the state of each switch unit Q connected to the signal input terminal IN of the shift register unit G is controlled so that an input signal received by the signal input terminal IN of the shift register unit G can be controlled, thereby controlling the time of the effective level of a gate driving signal Gout output by the shift register unit G.

Figure 3:
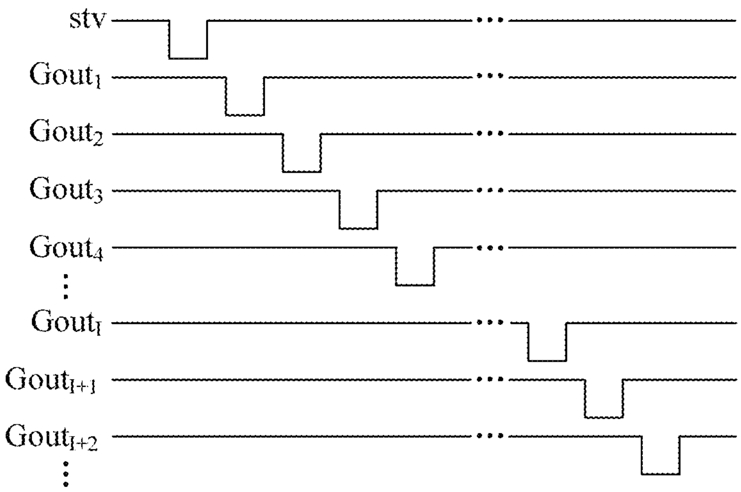
FIG. 3 is a drive timing diagram of the display panel according to an embodiment of the present application.

In an example embodiment, FIG. 3 is a drive timing diagram of the display panel according to an embodiment of the present application. Referring to FIGS. 2 and 3, for each shift register unit G, when a first switch unit $Q_1$ electrically connected to the shift register unit G is on, the signal input terminal IN of a shift register unit G starting from the second shift register unit can receive a gate driving signal output by a shift register unit G at the previous stage through the first switch unit $Q_1$. Optionally, the second-stage shift register unit $G_2$ receives the gate driving signal $Gout_1$ output by the first-stage shift register unit $G_1$ through the first switch unit $Q_1$ connected to the signal input terminal IN of the second-stage shift register unit $G_2$. The third-stage shift register unit $G_3$ receives the gate driving signal $Gout_2$ output by the second-stage shift register unit $G_2$ through the first switch unit $Q_1$ connected to the signal input terminal IN of the third-stage shift register unit $G_3$. The fourth-stage shift register unit $G_4$ receives the gate driving signal $Gout_3$ output by the third-stage shift register unit $G_3$ through the first switch unit $Q_1$ connected to the signal input terminal IN of the fourth-stage shift register unit $G_4$. The rest can be done in the same way such that the (I+2)-th-stage shift register unit $G_{I+2}$ receives the gate driving signal $Gout_{I+1}$ output by the (I+1)-th-stage shift register unit $G_{I+1}$ through the first switch unit $Q_1$ connected to the signal input terminal IN of the (I+2)-th-stage shift register unit $G_{I+2}$. In this case, effective levels of gate driving signals Gout ($Gout_1$, $Gout_2$, $Gout_3$, $Gout_4$, . . . , $Gout_I$, $Gout_{I+1}$, $Gout_{I+2}$, and the like) output by shift register units G can sequentially shift to perform progressive scanning on rows of pixels 20, thereby enabling data signals to be written to the corresponding rows of pixels 20. Moreover, pixels 20 connected to the same data line 31 receive effective levels of gate driving signals in a time-sharing manner so that the data line 31 can transmit data signals of the pixels 20 in a time-sharing manner, allowing the data signals of the pixels 20 to be written to the corresponding pixels 20 in a time-sharing manner, thereby enabling different data signals to be written to the pixels 20, and enabling the display panel 100 to present a high-resolution display image.

Figure 4:
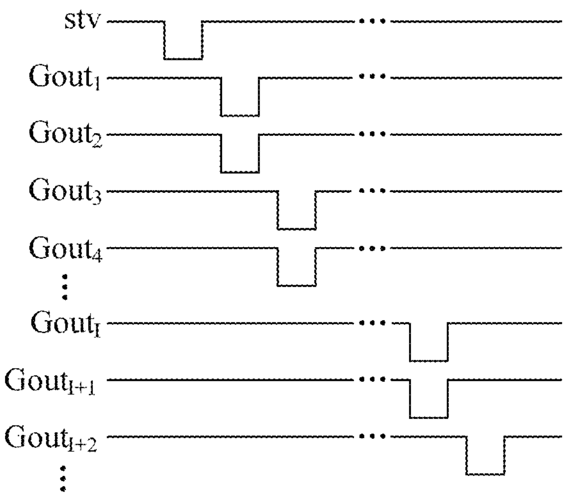
FIG. 4 is another drive timing diagram of the display panel according to an embodiment of the present application.

In another example embodiment, FIG. 4 is another drive timing diagram of the display panel according to an embodiment of the present application. Referring to FIGS. 2 and 4, for each shift register unit G, when a second switch unit $Q_2$ electrically connected to the shift register unit G is on, the signal input terminal IN of the first-stage shift register unit $G_1$ and the signal input terminal IN of the second-stage shift register unit $G_2$ both receive the start control signal stv of the start control signal terminal STV so that the first-stage shift register unit $G_1$ and the second-stage shift register unit $G_2$ can output gate driving signals under the control of the start control signal stv. In this case, the gate driving signal $Gout_1$ output by the first-stage shift register unit $G_1$ is the same as the gate driving signal $Gout_2$ output by the second-stage shift register unit $G_2$. Similarly, the signal input terminal IN of the third-stage shift register unit $G_3$ and the signal input terminal IN of the fourth-stage shift register unit $G_4$ both receive the gate driving signal $Gout_2$ output by the second-stage shift register unit $G_2$. In this case, the gate driving signal $Gout_3$ output by the third-stage shift register unit $G_3$ is the same as a gate driving signal $Gout_4$ output by the fourth-stage shift register unit $G_4$. Likewise, the signal input terminal IN of the (I+1)-th-stage shift register unit $G_{I+1}$ and the signal input terminal IN of the (I+2)-th-stage shift register unit $G_{I+2}$ both receive the gate driving signal $Gout_I$ output by the I-th-stage shift register unit $G_I$. In this case, the gate driving signal $Gout_{I+1}$ output by the (I+1)-th-stage shift register unit $G_{I+1}$ is the same as a gate driving signal $Gout_{I+2}$ output by the (I+2)-th-stage shift register unit $G_{I+2}$. With this arrangement, adjacent rows of pixels 20 receive the same gate driving signal so that two rows of pixels 20 are provided with a data signal simultaneously. In this case, data signals received by the two rows of pixels 20 are the same, thereby reducing the time for writing data signals to pixels 20 in the display panel 100. Moreover, the adjacent rows of pixels 20 have the same data signals so that the two rows of pixels 20 have the same display brightness. Therefore, the display resolution of the display panel 100 is reduced to some extent; however, there is no need to provide a data signal for each row of pixels 20, simplifying the driving manner of the display panel 100, reducing the driving power consumption of the display panel 100, and helping with the low power consumption of the display panel 100.

Figure 5:
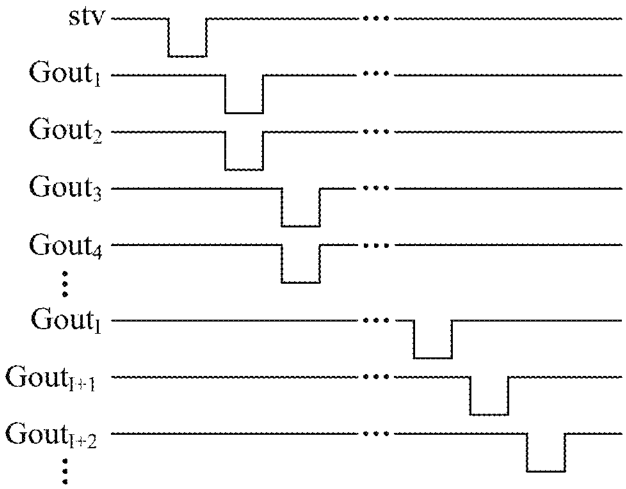
FIG. 5 is another drive timing diagram of the display panel according to an embodiment of the present application.

In another example embodiment, FIG. 5 is another drive timing diagram of the display panel according to an embodiment of the present application. Referring to FIGS. 2 and 5, the display panel 100 may include a high-resolution display region and a low-resolution display region. When effective levels of gate driving signals Gout are supplied to pixels 20 in the low-resolution display region, second switch units $Q_2$ may be controlled to be turned on so that adjacent shift register units G ($G_1$, $G_2$, $G_3$, $G_4$, and the like) connected to the pixels 20 in the low-resolution display region can output effective levels of gate driving signals Gout ($Gout_1$ and $Gout_2$, $Gout_3$ and $Gout_4$, or the like) simultaneously, thereby enabling a data signal to be written to two adjacent rows of pixels 20 simultaneously. When effective levels of gate driving signals Gout are supplied to pixels 20 in the high-resolution display region, first switch units $Q_1$ may be controlled to be turned on so that shift register units G ($G_I$, $G_{I+1}$, $G_{I+2}$, and the like) connected to the pixels 20 in the high-resolution display region can output effective levels of gate driving signals Gout ($Gout_I$, $Gout_{I+1}$, $Gout_{I+2}$, and the like) successively, thereby supplying different data signals to pixels 20. With this arrangement, the time of effective levels of gate driving signals Gout output by shift register units G can be controlled by controlling the time when the first switch units $Q_1$ are turned on and the time when the second switch units $Q_2$ are on, thereby enabling the display panel 100 to include display regions with different resolutions. Thus the foveated rendering technology can be implemented without setting a complex circuit structure and logical operation capability for a display driver chip for driving the display panel 100, reducing the size of the display driver chip, simplifying the operation logic of the display driver chip, reducing the cost of the display driver chip, and thereby reducing the driving cost of the display panel 100. This helps to achieve low power consumption and low cost for the display panel 100 while maintaining a high display quality of the display panel 100.

Figure 6:
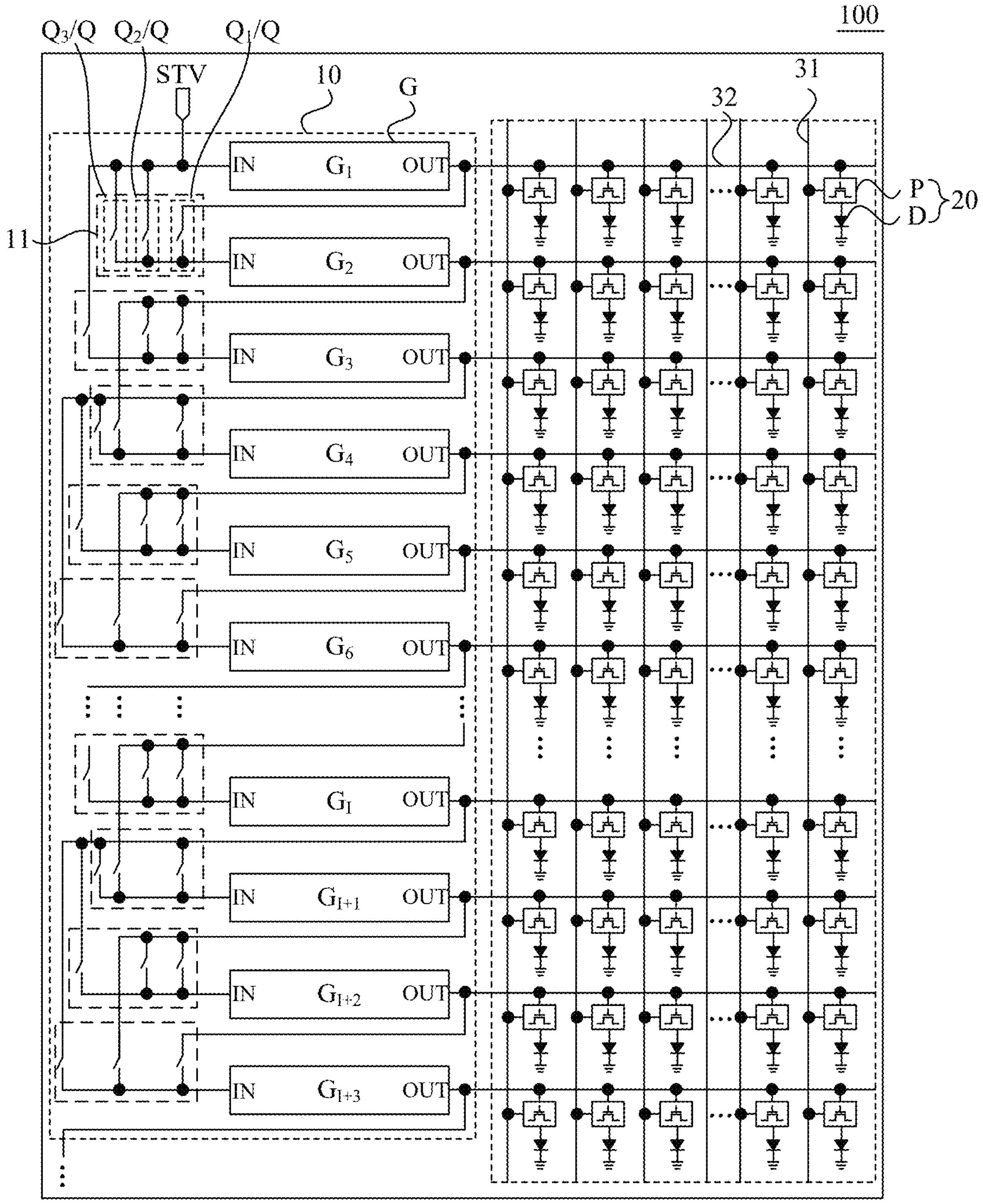
FIG. 6 is another structural diagram of the display panel according to an embodiment of the present application.
Figure 7:
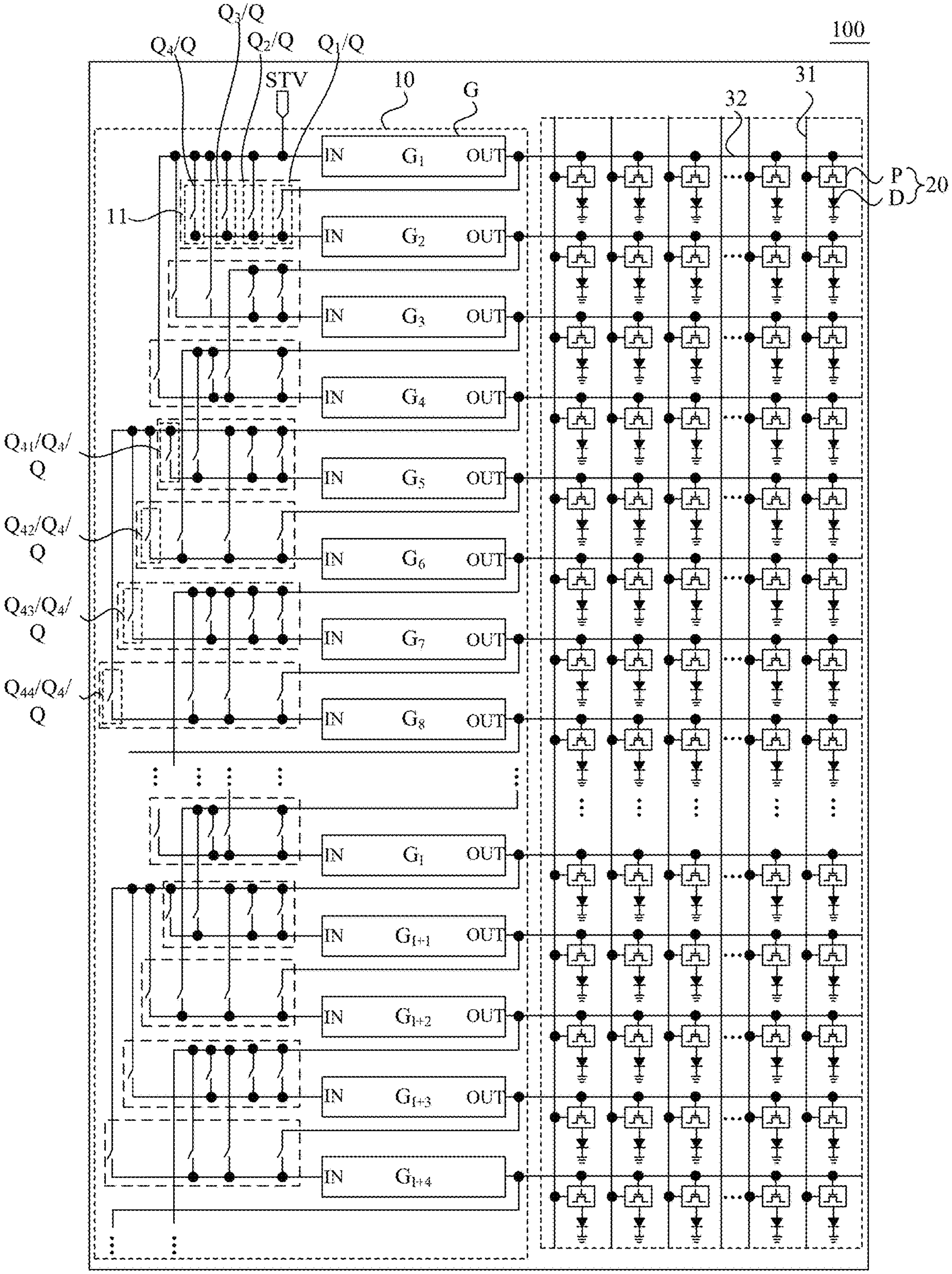
FIG. 7 is another structural diagram of the display panel according to an embodiment of the present application.

It is to be understood that technical solutions of embodiments of the present application are illustrated merely by using the preceding example in which N=2. In embodiments of the present application, n may be any integer equal to 3 (as shown in FIG. 6), equal to 4 (as shown in FIG. 7), or greater than 4. The value of n is not specifically limited in embodiments of the present application under the premise that the core invention points of embodiments of the present application can be achieved. For ease of description, under the premise of no special limitation, in embodiments of the present application, an example in which the N=4 is taken for exemplarily describing technical solutions of embodiments of the present application.

In this embodiment, switch modules corresponding to the shift register units other than the first-stage shift register unit are disposed in the driver circuit, and each switch module includes N switch units. In this case, signal input terminals of the shift register units other than the first shift register unit are electrically connected to switch units in the same switch module. Among the first N-stage shift register units, the signal input terminal of the M-th-stage shift register unit is electrically connected to a start control signal terminal through any one of an M-th switch unit to an N-th switch unit of the switch module corresponding to the M-th-stage shift register unit; and the signal input terminal of the M-th-stage shift register unit is electrically connected to the signal output terminal of at least one of a first-stage shift register unit to an (M−1)-th-stage shift register unit through a first switch unit to an (M−1)-th switch unit of the switch module corresponding to the M-th-stage shift register unit. The signal input terminal of an (I+N)-th-stage shift register unit is electrically connected to the signal output terminal of at least one of an I-th-stage shift register unit to an (I+N−1)-th-stage shift register unit through switch units of the switching module corresponding to the (I+N)-th-stage shift register unit. With this arrangement, the signal input terminal of a shift register unit other than the first-stage shift register unit may receive at least one input signal. Moreover, input signals received by signal input terminals of shift register units can be selectively controlled by controlling the state of switch units electrically connected to shift register units, thereby controlling the time of effective levels of gate driving signals output by signal output terminals of shift register units. In this case, the driver circuit can meet diverse driving requirements, thereby enabling the display panel to achieve the performance of low power consumption, low cost, and high display quality.

Optionally, a signal input terminal of a J-th-stage shift register unit is electrically connected to a signal output terminal of an S-th-stage shift register unit through a K-th switch unit in a switch module corresponding to the J-th-stage shift register unit. J, K, and S are cach a positive integer. J>S. J>K. K≤N. When J/K≠[J/K], S=[J/K]*K. Alternatively, when J/K=[J/K], S=(J/K−1)*K.

Exemplarily, as shown in FIG. 7, by way of example, N=4. When J=2, K may be equal to 1, and S=1. That is, the signal input terminal IN of the second-stage shift register unit $G_2$ may be electrically connected to the signal output terminal OUT of the first-stage shift register unit $G_1$ through a first switch unit $Q_1$ of the switch module corresponding to the second-stage shift register unit $G_2$. When J=3, K may be equal to 1 or 2, and S=2. That is, the signal input terminal IN of the third-stage shift register unit $G_3$ is electrically connected to the signal output terminal OUT of the second-stage shift register unit $G_2$ through a first switch unit $Q_1$ or a second switch unit $Q_2$ of the switch module corresponding to the third-stage shift register unit $G_3$. When J=4, K may be 1, 2, or 3. Moreover, when K=1 or 3, S=3; and when K=2, S=2. That is, the signal input terminal IN of the fourth-stage shift register unit $G_4$ is electrically connected to the signal output terminal OUT of the third-stage shift register unit $G_3$ through a first switch unit $Q_1$ or a third switch unit $Q_3$ of the switch module corresponding to the fourth-stage shift register unit $G_4$; alternatively, the signal input terminal IN of the fourth-stage shift register unit $G_4$ is also electrically connected to the signal output terminal OUT of the second-stage shift register unit $G_2$ through a second switch unit $Q_2$ of the switch module corresponding to the fourth-stage shift register unit $G_4$. When J=5, K may be 1, 2, 3, or 4. Moreover, when K=1, 2, or 4, S=4; and when K=3, S=3. That is, the signal input terminal IN of a fifth-stage shift register unit $G_5$ is electrically connected to the signal output terminal OUT of the fourth-stage shift register unit $G_4$ through a first switch unit $Q_1$, a second switch unit $Q_2$, or a fourth switch unit $Q_4$ of the switch module corresponding to the fifth-stage shift register unit $G_5$; alternatively, the signal input terminal IN of the fifth-stage shift register unit $G_5$ is also electrically connected to the signal output terminal OUT of the third-stage shift register unit $G_3$ through a third switch unit $Q_3$ of the switch module corresponding to the fifth-stage shift register unit $G_5$. When J=6, K may also be 1, 2, 3, or 4. Moreover, when K=1, S=5; when K=2 or 4, S=4; and when K=3, S=3. That is, the signal input terminal IN of a sixth-stage shift register unit $G_6$ is electrically connected to the signal output terminal OUT of the fifth-stage shift register unit $G_5$ through a first switch unit $Q_1$ of a switch module corresponding to the sixth-stage shift register unit $G_6$, alternatively, the signal input terminal IN of a sixth-stage shift register unit $G_6$ is electrically connected to the signal output terminal OUT of the fourth-stage shift register unit $G_4$ through a second switch unit $Q_2$ or a fourth switch unit $Q_4$ of the switch module corresponding to the sixth-stage shift register unit $G_6$, alternatively, the signal input terminal IN of a sixth-stage shift register unit $G_6$ is also electrically connected to the signal output terminal OUT of the third-stage shift register unit $G_3$ through a third switch unit $Q_3$ of the switch module corresponding to the sixth-stage shift register unit $G_6$. The rest can be done in the same way. When J is less than or equal to N, the signal input terminal IN of a shift register unit G other than the first-stage shift register unit may receive at least two different input signals through different switch units Q. When J is greater than or equal to N, the signal input terminal IN of a shift register unit G may receive one, two, three, or more input signals through different switch units Q. In this case, for each shift register unit G, gate driving signals Gout output by the signal input terminal of the shift register unit G can be controlled by controlling the state of switch units electrically connected to the shift register unit G. Therefore, the display panel 100 can meet the display requirements of different display resolutions, guaranteeing the low power consumption and low cost of the display panel 100.

In an optional embodiment, continuing to refer to FIG. 7, K-th switch units QK are connected in parallel to the signal output terminal OUT of the shift register unit G, where the K-th switch units $Q_K$ are in different switch modules and are electrically connected to the signal output terminal of the shift register unit G.

Exemplarily, by way of example, K=4. The signal output terminal OUT of the fourth-stage shift register unit $G_4$ is electrically connected to four fourth switch units $Q_4$ which are in four different switch modules. The four fourth switch units $Q_4$ are a first fourth switch unit $Q_{41}$, a second fourth switch unit $Q_{42}$, a third fourth switch unit $Q_{43}$, and a fourth fourth switch unit $Q_{44}$, respectively. In this case, the switch input terminal of the first fourth switch unit $Q_{41}$, the switch input terminal of the second fourth switch unit $Q_{42}$, the switch input terminal of the third fourth switch unit $Q_{43}$, and the switch input terminal of the fourth fourth switch unit $Q_{44}$ are electrically connected to the signal output terminal OUT of the fourth-stage shift register unit $G_4$ through different connection lines. The switch output terminal of the first fourth switch unit $Q_{41}$ is electrically connected to the signal input terminal IN of the fifth-stage shift register unit $G_5$. The switch output terminal of the second fourth switch unit $Q_{42}$ is electrically connected to the signal input terminal IN of the sixth-stage shift register unit $G_6$. The switch output terminal of the third fourth switch unit $Q_{43}$ is electrically connected to the signal input terminal IN of a seventh-stage shift register unit $G_7$. The switch output terminal of the fourth fourth switch unit $Q_{44}$ is electrically connected to the signal input terminal IN of an eighth-stage shift register unit $G_8$. In this case, when the fourth switch units $Q_4$ are on, input signals received by the signal input terminal IN of the fifth-stage shift register unit $G_5$, the signal input terminal IN of the sixth-stage shift register unit $G_6$, the signal input terminal IN of the seventh-stage shift register unit $G_7$, and the signal input terminal IN of the eighth-stage shift register unit $G_8$ do not interfere with each other. Moreover, each connection line bears a relatively small load, which is conducive to the accuracy of signal transmission. Therefore, such an arrangement enhances the accuracy of signals output by shift register units G in the driver circuit 10, thereby improving the accuracy of the image display of the display panel 100.

Figure 8:
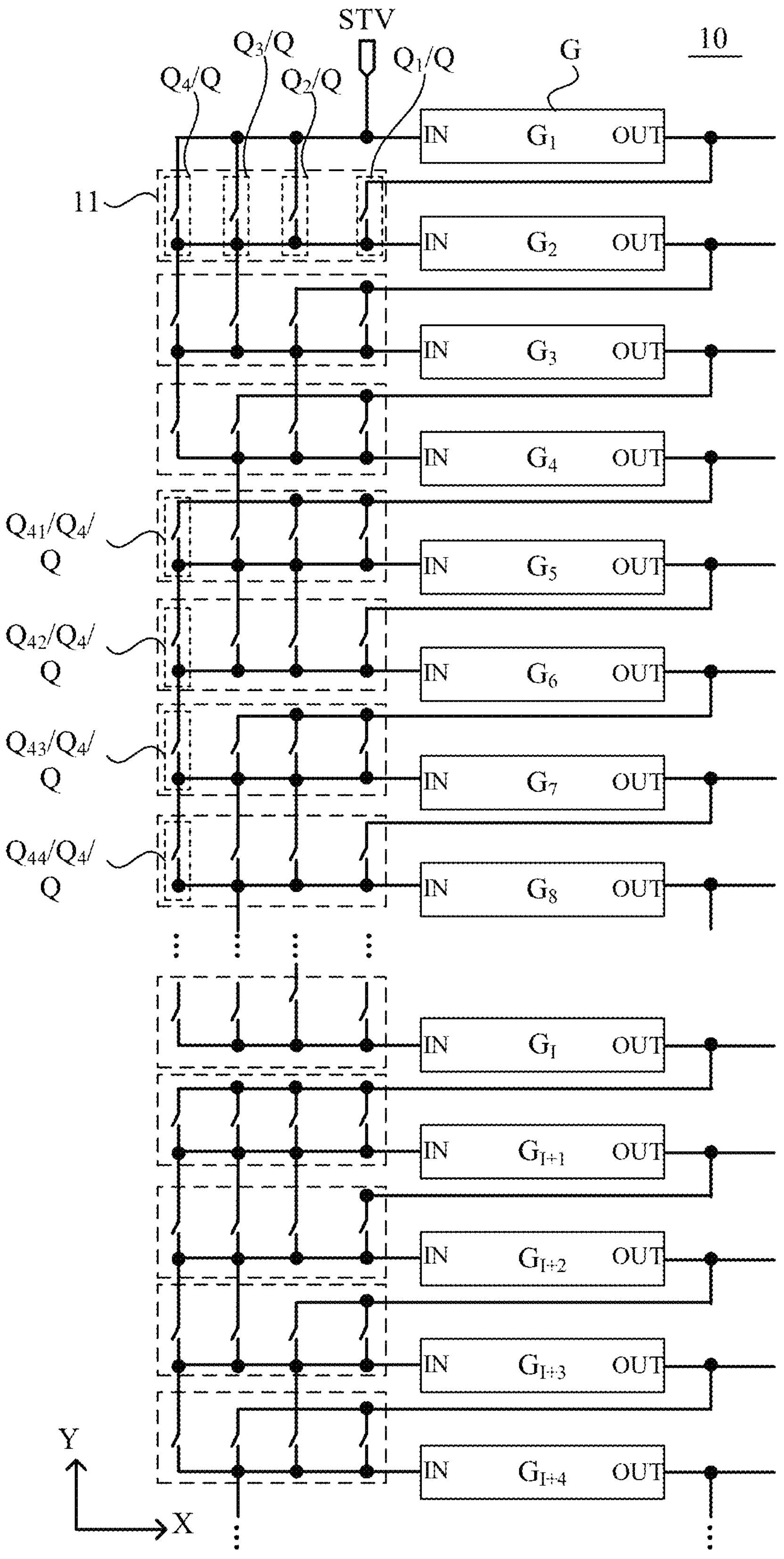
FIG. 8 is a structural diagram of a driver circuit according to an embodiment of the present application.

In another optional embodiment, FIG. 8 is a structural diagram of the driver circuit according to an embodiment of the present application. As shown in FIG. 8, K-th switch units are connected in series to the signal output terminal OUT of the shift register unit G, where the K-th switch units are in different switch modules and are electrically connected to the signal output terminal of the one shift register unit.

Exemplarily, by way of example, K=4. The four fourth switch units $Q_4$ electrically connected to the signal output terminal OUT of the fourth-stage shift register unit $G_4$ are the first fourth switch unit $Q_{41}$, the second fourth switch unit $Q_{42}$, the third fourth switch unit $Q_{43}$, and the fourth fourth switch unit $Q_{44}$, respectively. The switch input terminal of the first fourth switch unit $Q_{41}$ is electrically connected to the signal output terminal OUT of the fourth-stage shift register unit $G_4$. The switch output terminal of the first fourth switch unit $Q_{41}$ is electrically connected to the switch input terminal of the second fourth switch unit $Q_{42}$ and the signal input terminal IN of the fifth-stage shift register unit $G_5$. The switch output terminal of the second fourth switch unit $Q_{42}$ is electrically connected to the switch input terminal of the third fourth switch unit $Q_{43}$ and the signal input terminal IN of the sixth-stage shift register unit $G_6$. The switch output terminal of the third fourth switch unit $Q_{43}$ is electrically connected to the switch input terminal of the fourth fourth switch unit $Q_{44}$ and the signal input terminal IN of the seventh-stage shift register unit $G_7$. The switch output terminal of the fourth fourth switch unit $Q_{44}$ is electrically connected to the signal input terminal IN of the eighth-stage shift register unit $G_8$. When each fourth switch unit $Q_4$ is on, the fifth-stage shift register unit $G_5$ can receive the gate driving signal $Gout_4$ output by the fourth-stage shift register unit $G_4$ through the first fourth switch unit $Q_{41}$; the sixth-stage shift register unit $G_6$ can receive the gate driving signal $Gout_4$ output by the fourth-stage shift register unit $G_4$ through the second fourth switch unit $Q_{42}$ and the first fourth switch unit $Q_{41}$ sequentially; the seventh-stage shift register unit $G_7$ can receive the gate driving signal $Gout_4$ output by the fourth-stage shift register unit $G_4$ through the third fourth switch unit $Q_{43}$, the second fourth switch unit $Q_{42}$, and the first fourth switch unit $Q_{41}$ sequentially; and the eighth-stage shift register unit $G_8$ can receive the gate driving signal $Gout_4$ output by the fourth-stage shift register unit $G_4$ through the fourth fourth switch unit $Q_{44}$, the third fourth switch unit $Q_{43}$, the second fourth switch unit $Q_{42}$, and the first fourth switch unit $Q_{41}$ sequentially. Such an arrangement may reduce the number of connection lines for connecting the fourth switch units $Q_4$ to the signal output terminal OUT of the fourth-stage shift register unit $G_4$, enabling the fourth switch units $Q_4$ to be arranged sequentially in a first direction Y, minimizing the size of switch units Q occupied in a second direction X, and thereby contributing to a narrow bezel of the display panel. The first direction X intersects the second direction Y.

Figure 9:
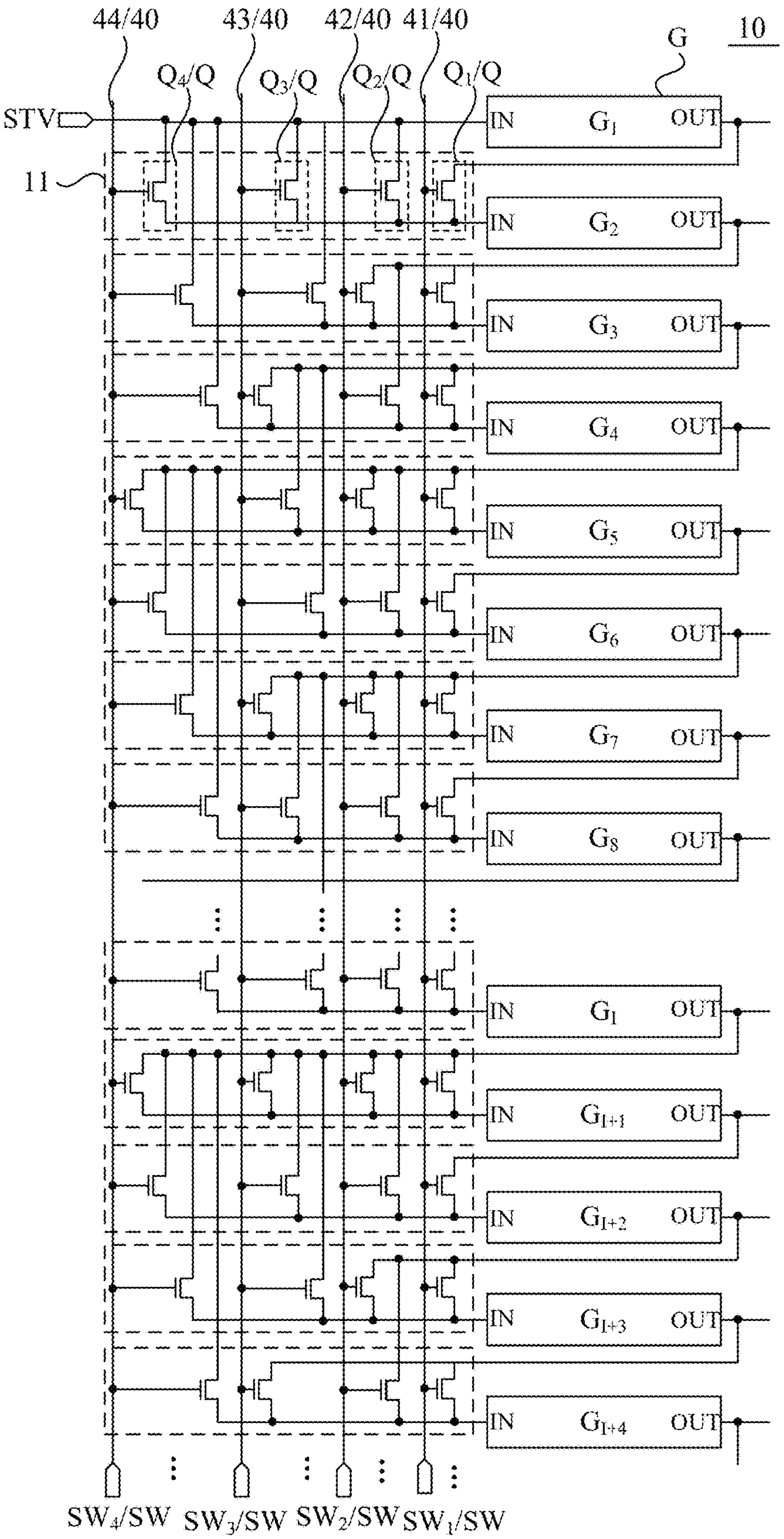
FIG. 9 is another structural diagram of the driver circuit according to an embodiment of the present application.
Figure 10:
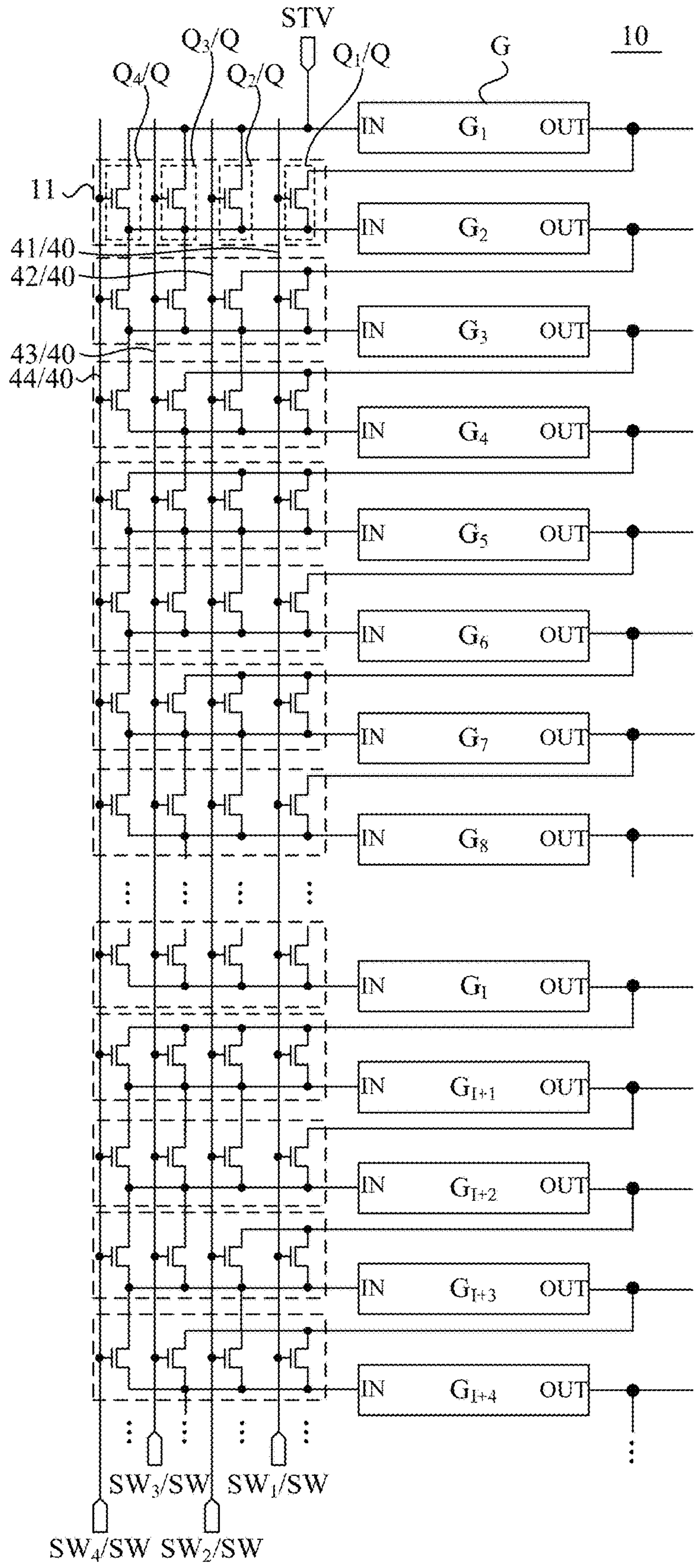
FIG. 10 is another structural diagram of the driver circuit according to an embodiment of the present application.

Optionally, FIG. 9 is another structural diagram of the driver circuit according to an embodiment of the present application. FIG. 10 is another structural diagram of the driver circuit according to an embodiment of the present application. Referring to FIG. 9 or 10, a switch unit Q may include a switch transistor. A first electrode of the switch transistor is the switch input terminal of the switch unit Q. A second electrode of the switch transistor is the switch output terminal of the switch unit Q. A gate of the switch transistor is configured to receive a switch control signal SW. Switch transistors of the same switch module 11 are configured to receive different switch control signals SW.

Exemplarily, as shown in FIG. 9, by way of example, each switch module 11 includes four switch units. In four switch units electrically connected to the signal input terminal IN of the fifth-stage shift register unit $G_5$, the first electrode of the switch transistor of the first switch unit $Q_1$, the first electrode of the switch transistor of the second switch unit $Q_2$, and the first electrode of the switch transistor of the fourth switch unit $Q_4$ are each electrically connected to the signal output terminal Gout of the fourth-stage shift register unit $G_4$; the first electrode of the switch transistor of the third switch unit $Q_3$ is electrically connected to the signal output terminal Gout of the third-stage shift register unit $G_3$; the second electrode of the switch transistor of the first switch unit $Q_1$, the second electrode of the switch transistor of the second switch unit $Q_2$, the second electrode of the switch transistor of the third switch unit $Q_3$, and the second electrode of the switch transistor of the fourth switch unit $Q_4$ are each electrically connected to the signal input terminal IN of the fifth-stage shift register unit $G_5$; the gate of the switch transistor of the first switch unit $Q_1$ receives a first switch control signal $SW_1$; the gate of the switch transistor of the second switch unit $Q_2$ receives a second switch control signal $SW_2$; the gate of the switch transistor of the third switch unit $Q_3$ receives a third switch control signal $SW_3$; and the gate of the switch transistor of the fourth switch unit $Q_4$ receives a fourth switch control signal $SW_4$. In this case, the first switch control signal $SW_1$ may control the switch transistor of the first switch unit $Q_1$ to be turned on or off. The second switch control signal $SW_2$ can control the switch transistor of the second switch unit $Q_2$ to be turned on or off. The third switch control signal $SW_3$ can control the switch transistor of the third switch unit $Q_3$ to be turned on or off. The fourth switch control signal $SW_4$ can control the switch transistor of the fourth switch unit $Q_4$ to be turned on or off. With this arrangement, different switch control signals SW control switch transistors of different switch units in the same switch module 11 to be turned on or off so that various switch transistors may be turned on in a time-sharing manner. Therefore, the display resolution of the display panel may be selected as needed.

Optionally, continuing to refer to FIG. 9 or 10, the display panel may further include N switch signal transmission lines for transmitting switch control signals. Gates of switch transistors of the same switch module 11 are correspondingly electrically connected to different switch signal transmission lines 40. Gates of switch transistors of K-th switch units $Q_K$ are electrically connected to the same switch signal transmission line, where the K-th switch units are in different switch modules and are electrically connected to the shift register units. K≤N. K is a positive integer.

That gates of switch transistors of K-th switch units $Q_K$ electrically connected to shift register units G are electrically connected to the same switch signal transmission line may be understood as follows: The gate of the switch transistor of the first switch unit $Q_1$ connected to the second-stage shift register unit $G_2$, the gate of the switch transistor of the first switch unit $Q_1$ connected to the third-stage shift register unit $G_3$, . . . , the gate of the switch transistor of the first switch unit $Q_1$ connected to the (I+N)-th-stage shift register unit $G_{I+N}$, and the like are each electrically connected to a first switch control signal line 41 so as to be turned on or off under the control of the first switch control signal $SW_1$ transmitted by the first switch control signal line 41; the gate of the switch transistor of the second switch unit $Q_2$ connected to the second-stage shift register unit $G_2$, the gate of the switch transistor of the second switch unit $Q_2$ connected to the third-stage shift register unit $G_3$, . . . , the gate of the switch transistor of the second switch unit $Q_2$ connected to the (I+N)-th-stage shift register unit $G_{I+N}$, and the like are each electrically connected to a second switch control signal line 42 so as to be turned on or off under the control of the second switch control signal $SW_2$ transmitted by the second switch control signal line 42; the gate of the switch transistor of the third switch unit $Q_3$ connected to the second-stage shift register unit $G_2$, the gate of the switch transistor of the third switch unit $Q_3$ connected to the third-stage shift register unit $G_3$, . . . , the gate of the switch transistor of the third switch unit $Q_3$ connected to the (I+N)-th-stage shift register unit $G_{I+N}$, and the like are each electrically connected to a third switch control signal line 43 so as to be turned on or off under the control of the third switch control signal $SW_3$ transmitted by the third switch control signal line 43; and the gate of the switch transistor of the fourth switch unit $Q_4$ connected to the second-stage shift register unit $G_2$, the gate of the switch transistor of the fourth switch unit $Q_4$ connected to the third-stage shift register unit $G_3$, . . . , the gate of the switch transistor of the fourth switch unit $Q_4$ connected to the (I+N)-th-stage shift register unit $G_{I+N}$, and the like are each electrically connected to a fourth switch control signal line 44 so as to be turned on or off under the control of the fourth switch control signal $SW_4$ transmitted by the fourth switch control signal line 44.

With this arrangement, gates of switch transistors of K-th switch units $Q_K$ electrically connected to shift register units G are electrically connected to the same switch signal transmission line 40 so that switch transistors of these K-th switch units $Q_K$ are turned on or off simultaneously. Moreover, when gates of switch transistors of switch units Q of the same switch module 11 are electrically connected to different switch signal transmission lines 40, the switch transistors of the switch units Q of the same switch module 11 are of the same type or different types so that switch control signals SW transmitted by different switch signal transmission lines 40 may be supplied to gates of switch transistors of different switch units Q. Therefore, states of the switch transistors of the switch units Q do not interfere with each other and can be controlled accurately, improving the accuracy of gate driving signals Gout output by shift register units G in the driver circuit 10.

It is to be understood that when a switch control signal SW transmitted by a switch signal transmission line 40 is at an effective level, the switch transistor in a switch unit Q may be controlled to be turned on. When a switch control signal SW transmitted by a switch signal transmission line 40 is at an ineffective level, the switch transistor in a switch unit Q may be controlled to be turned off. One of the effective level and the ineffective level may be a high level, and the other may be a low level. For example, when the switch transistor in a switch unit Q is an n-type transistor, the effective level and ineffective level of a corresponding switch control signal are a high level and a low level, respectively. When the switch transistor in a switch unit Q is a p-type transistor, the effective level and ineffective level of a corresponding switch control signal are a low level and a high level, respectively. In embodiments of the present application, the type of a switch transistor may be set according to actual requirements, which is not specifically limited in embodiments of the present application. For ease of description, in embodiments of the present application, an example in which a switch transistor is a p-type transistor is taken for exemplarily describing technical solutions of embodiments of the present application.

In an optional embodiment, display modes of the display panel include a first mode. One of a first switch unit to an N-th switch unit is controlled to be turned on within the display time of one frame of image in the first mode.

It is to be understood that the display time of one frame of an image may be equal to the period from the moment when a data signal starts to be written to the first row of pixels to the moment when a data signal starts to be written to the first row of pixels again. During this period, data signals need to be written to rows of pixels. Therefore, within the display time of one frame of the image, shift register units may output effective levels of gate driving signals to refresh data signals of the rows of pixels.

Figure 11:
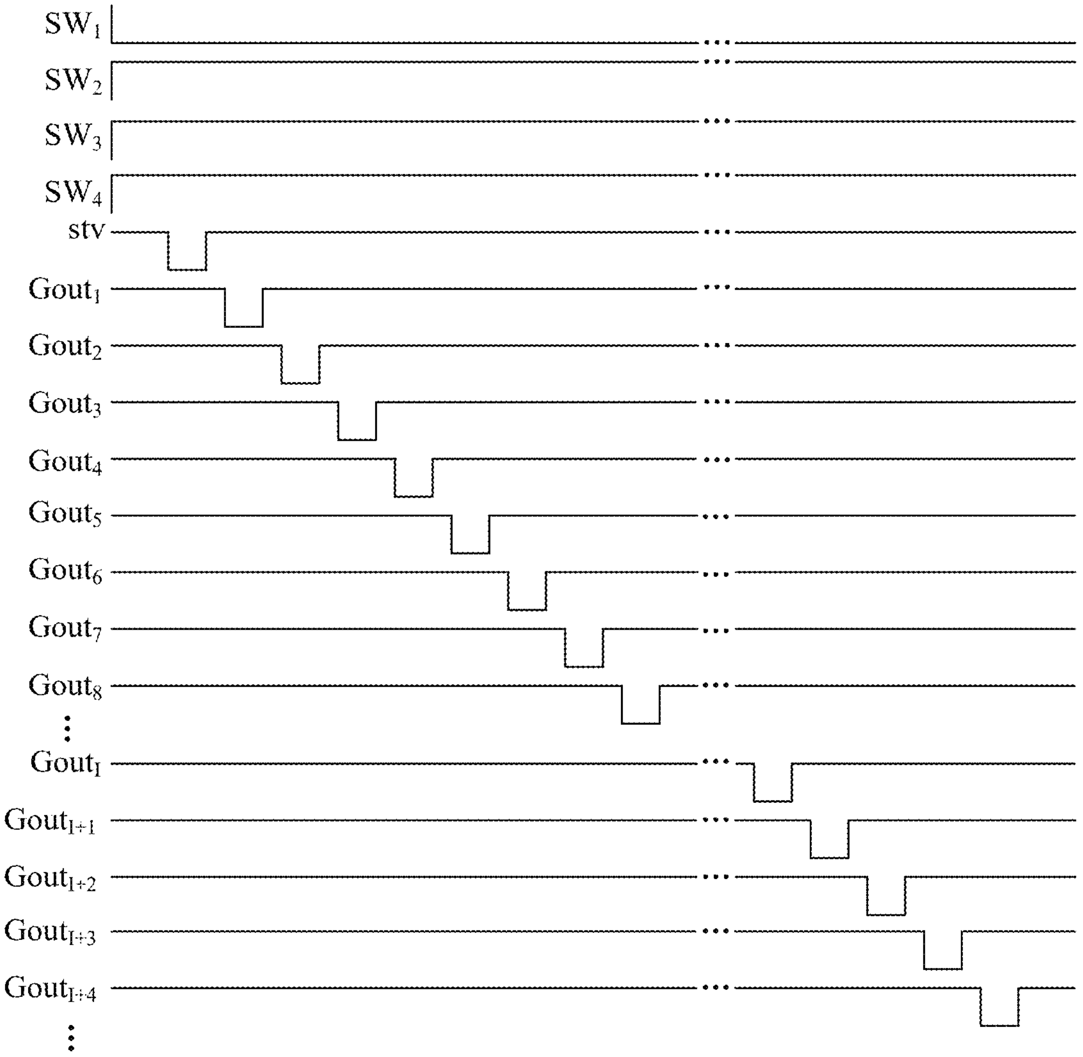
FIG. 11 is another drive timing diagram of the display panel according to an embodiment of the present application.

Optionally, when the display panel displays an image, a data signal refresh manner for the rows of pixels may be selected as needed. For example, data signals of the rows of pixels may be refreshed by row. In this case, effective levels of gate driving signals need to be supplied to the rows of pixels sequentially. Therefore, first switch units electrically connected to shift register units may be controlled to be turned on. As shown in FIG. 11, within the display time of one frame of image in the first mode, the first switch control signal $SW_1$ received by the switch transistor of a first switch unit is at an effective level, and switch control signals ($SW_2$, $SW_3$, and $SW_4$) received by switch transistors of other switch units are at an ineffective level. In this case, the first switch unit remains turned on. Among two adjacent shift register units, a gate driving signal output by a previous shift register unit may serve as an input signal received by a next shift register unit. Shift register units in the driver circuit output effective levels of gate driving signals ($Gout_1$, $Gout_2$, $Gout_3$, $Gout_4$, . . . , $Gout_I$, $Gout_{I+1}$, $Gout_{I+2}$, $Gout_{I+3}$, $Gout_{I+4}$, and the like) sequentially to perform progressive scanning on rows of pixels, thereby enabling data signals of the rows of pixels to be refreshed sequentially.

Figure 12:
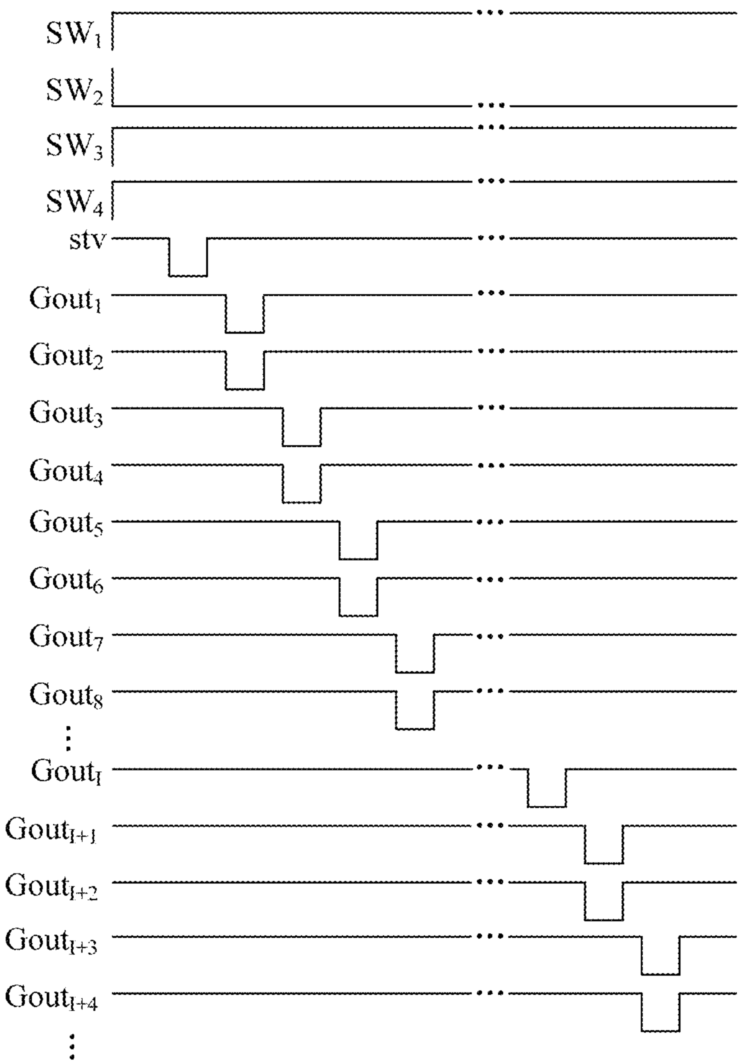
FIG. 12 is another drive timing diagram of the display panel according to an embodiment of the present application.

In other example embodiments, when the display panel displays an image, data signals of two adjacent rows of pixels may also be controlled to be refreshed simultaneously. In this case, as shown in FIG. 12, the second switch control signal $SW_2$ may be controlled to be at an effective level, and switch control signals ($SW_1$, $SW_3$, and $SW_4$) received by switch transistors of other switch units are at an ineffective level. In this case, a second switch unit is on. Two adjacent shift register units may receive the same input signals. Every two adjacent shift register units in the driver circuit may form a shift register unit group. Gate driving signals output by shift register units in the same shift register unit group are the same. For example, the first-stage shift register unit and the second-stage shift register unit form one shift register unit group, and the third-stage shift register unit and the fourth-stage shift register unit form one shift register unit group. In this case, the gate driving signal $Gout_1$ output by the first-stage shift register unit is the same as the gate driving signal $Gout_2$ output by the second-stage shift register unit, and the gate driving signal $Gout_3$ output by the third-stage shift register unit is the same as the gate driving signal $Gout_4$ output by the fourth-stage shift register unit. Moreover, effective levels of gate driving signals ($Gout_1$, $Gout_3$, . . . , $Gout_I$, $Gout_{I+1}$, $Gout_{I+3}$, and the like) output by shift register unit groups are shifted sequentially so that data signals of the two adjacent rows of pixels are refreshed simultaneously.

Figure 13:
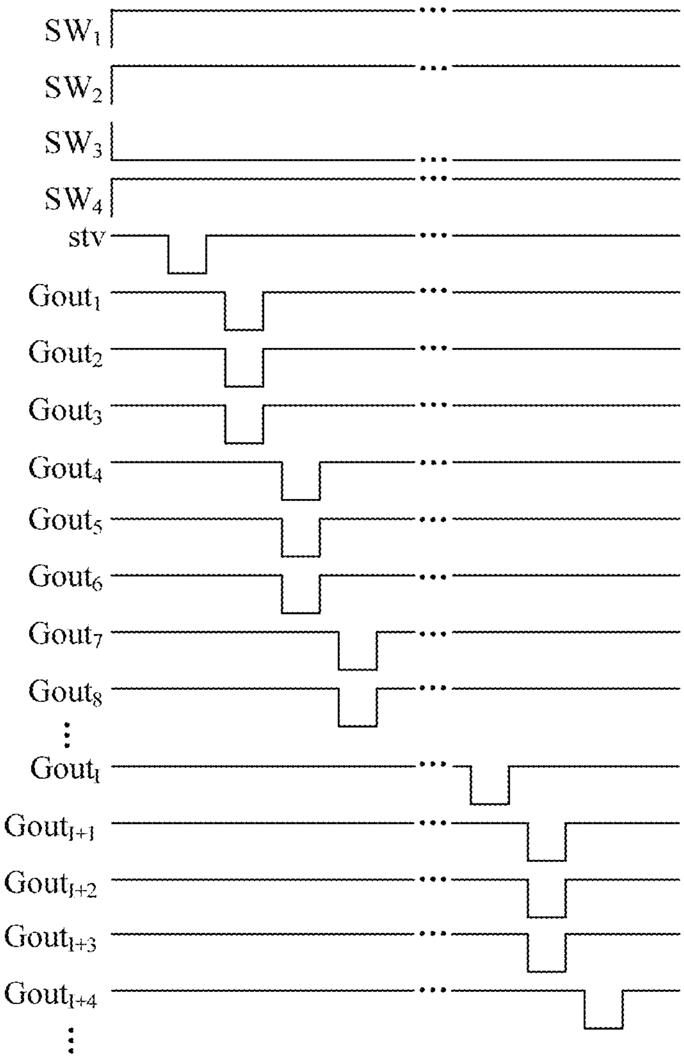
FIG. 13 is another drive timing diagram of the display panel according to an embodiment of the present application.
Figure 14:
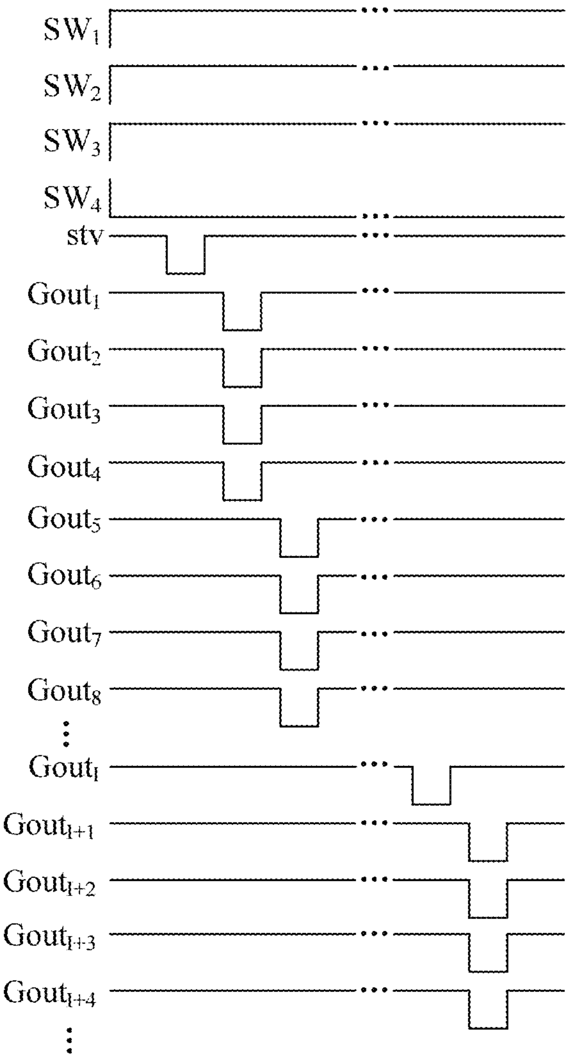
FIG. 14 is another drive timing diagram of the display panel according to an embodiment of the present application.

It is to be noted that technical solutions of embodiments of the present application are illustrated merely by using the preceding example in which data signals of rows of pixels in the display panel are refreshed by row and in which data signals of the two adjacent rows of pixels are refreshed simultaneously. In embodiments of the present application, as shown in FIG. 13, data signals of three rows of pixels may be refreshed simultaneously. Alternatively, as shown in FIG. 14, data signals of four rows of pixels may be refreshed simultaneously. For the specific principles, reference may be made to the preceding description and is not repeated here.

Optionally, display modes of the display panel include a second mode. The display time of one frame of image in the second mode includes at least one first phase and at least one second phase. One of a first switch unit to an N-th switch unit is controlled to be turned on in each of the at least one first phase and the at least one second phase, and a switch unit turned on in one of the at least one first phase is different from a switch unit turned on in one of the at least one second phase.

It is to be understood that the display time of one frame of image in the second mode includes at least one first phase and at least one second phase. That is, the number of first phases may be one, two, or more. Similarly, the number of second phases may be one, two, or more. The number of first phases may be the same as or different from the number of second phases, which is not specifically limited in embodiments of the present application. Moreover, a first phase and a second phase may alternate or may exist in other forms, which is not specifically limited in embodiments of the present application.

Figure 15:
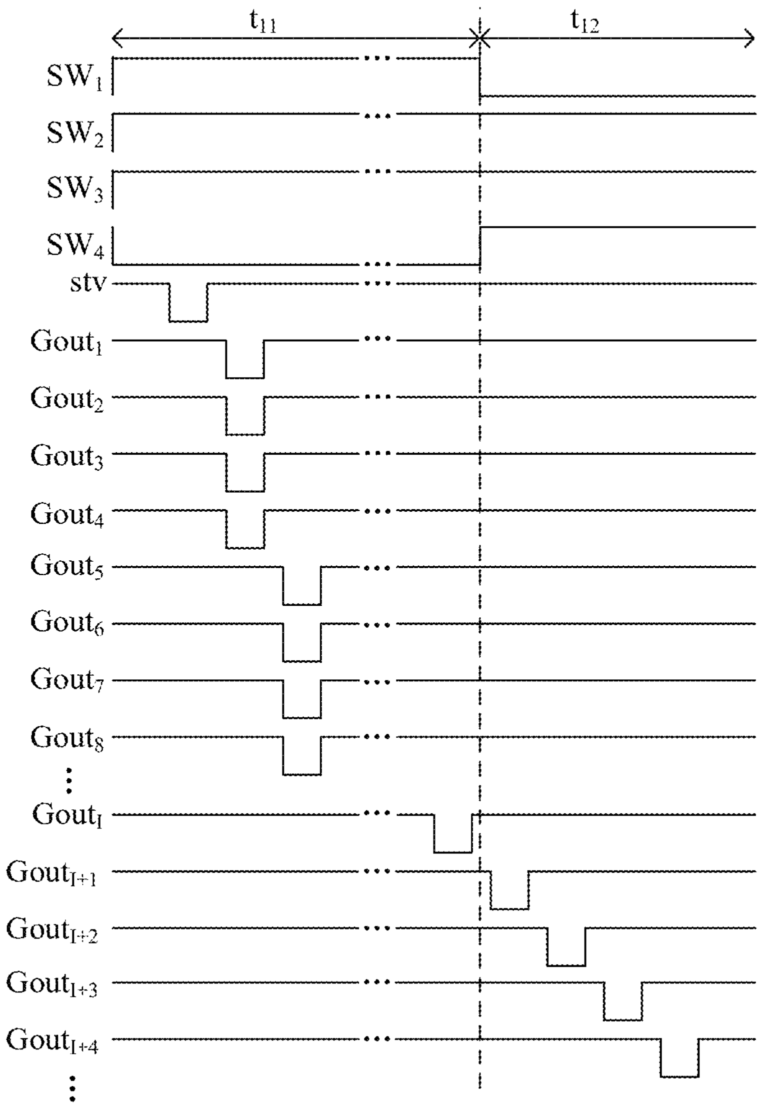
FIG. 15 is another drive timing diagram of the display panel according to an embodiment of the present application.

Exemplarily, the driver circuit shown in FIG. 9 is taken as an example. FIG. 15 is another drive timing diagram of the driver circuit according to an embodiment of the present application. Referring to FIGS. 9 and 15, in the second mode, the display time of one frame of image of the display panel includes a first phase $t_{11}$ and a second phase $t_{12}$. In the first phase $t_{11}$, the fourth switch control signal $SW_4$ is at an effective level and may control the corresponding fourth switch unit $Q_4$ to be turned on, enabling four adjacent shift register units to output effective levels of gate driving signals simultaneously. After the I-th-stage shift register unit $G_I$ outputs the effective level of the gate driving signal $Gout_I$, the second phase $t_{12}$ is entered. The fourth switch control signal $SW_4$ may be controlled to change to be at an ineffective level, and the first switch control signal $SW_1$ may be controlled to change to be at an effective level. Accordingly, the corresponding first switch unit $Q_1$ is turned on. Shift register units G starting from the (I+1)-th-stage shift register unit $G_{I+1}$ can output effective levels of gate driving signals ($Gout_{I+1}$, $Gout_{I+2}$, $Gout_{I+3}$, $Gout_{I+4}$, and the like) sequentially. In this case, the display panel may include two display regions with different driving manners. In a display region where pixels electrically connected to the first-stage shift register unit $G_1$ to the I-th-stage shift register unit Gr are located, data signals of four adjacent rows of pixels may be refreshed simultaneously. Therefore, data signals written to the four adjacent rows of pixels and in the same column are the same so that an image displayed in the display region has a relatively low resolution. In a display region where pixels electrically connected to the (I+1)-th-stage shift register unit $G_{I+1}$ to a last-stage shift register unit are located, data signals of the rows of pixels may be refreshed by row. Therefore, data signals written to the pixels may be different so that an image displayed in the display region has a relatively high resolution. With this arrangement, in the second mode, an image displayed by the display panel may consist of a high-resolution display image and a low-resolution display image. In this case, the region where the high-resolution display image is located may be a region where the human eye focuses, and the region where the low-resolution display image is located may be a region outside the focus of the human eye. Therefore, the foveated rendering technology can be implemented for the display panel by controlling the turned-on states of switch units in different phases, thereby contributing to the low power consumption and low cost of the display panel under the premise of improving the display effect of the display panel.

Optionally, display modes of the display panel include an X-th mode. The display time of one frame image in the X-th mode includes at least one first phase, at least one second phase, . . . , and at least one X-th phase. One of a first switch unit to an N-th switch unit is controlled to be turned on in each of the at least one first phase to the at least one X-th phase. Switch units turned on in different phases are different. X is a positive integer greater than or equal to 3.

Figure 16:
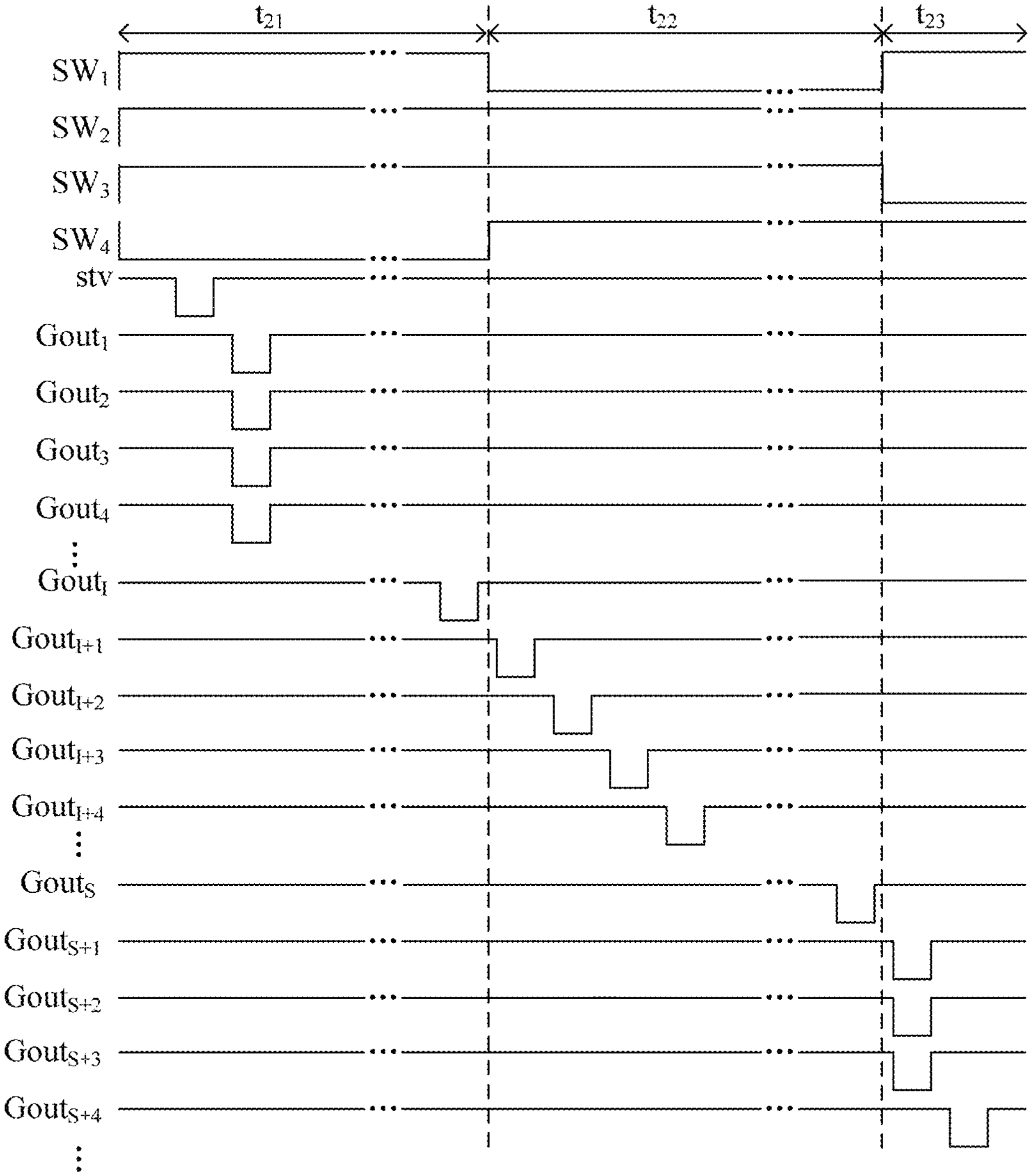
FIG. 16 is another drive timing diagram of the display panel according to an embodiment of the present application.

In an example embodiment, referring to FIGS. 9 and 16, by way of example, X=3. In a third mode, the display time of one frame of image of the display panel may include a first phase $t_{21}$, a second phase $t_{22}$, and a third phase $t_{23}$. In the first stage $t_{21}$, the fourth switch control signal $SW_4$ is at an effective level and may control the corresponding fourth switch unit $Q_4$ to be turned on, enabling four adjacent shift register units to output effective levels of gate driving signals simultaneously. After the I-th-stage shift register unit $G_I$ outputs the effective level of the gate driving signal $Gout_1$, the second phase $t_{22}$ is entered. The fourth switch control signal $SW_4$ may be controlled to change to be at an ineffective level, and the first switch control signal $SW_1$ may be controlled to change to be at an effective level. Accordingly, the corresponding first switch unit $Q_1$ is turned on. The (I+1)-th-stage shift register unit $G_{I+1}$ to the S-th-stage shift register unit $G_S$ can output effective levels of gate driving signals ($Gout_{I+1}$, $Gout_{I+2}$, $Gout_{I+3}$, $Gout_{I+4}$, . . . , and $Gout_S$) sequentially. After the S-th-stage shift register unit $G_S$ outputs the effective level of the gate driving signal $Gout_S$, the third phase $t_{23}$ may be entered. The first switch control signal $SW_1$ may be controlled to change to be at an ineffective level, and the third switch control signal $SW_3$ may be controlled to change to be at an effective level. Accordingly, the corresponding third switch unit $Q_3$ is turned on. Therefore, among shift register units G starting from the (S+1)-th-stage shift register unit $G_{S+1}$, three adjacent shift register units G may output gate driving signals simultaneously. For example, the gate driving signal $Gout_{S+1}$, the gate driving signal $Gout_{S+2}$, and the driving signal $Gout_{S+3}$ are the same. In this case, the display panel may include three display regions with different driving manners. In a display region where pixels electrically connected to the first-stage shift register unit $G_1$ to the I-th-stage shift register unit $G_I$ are located, data signals of four adjacent rows of pixels may be refreshed simultaneously. Therefore, data signals written to the four adjacent rows of pixels and in the same column are the same so that an image displayed in the display region has a relatively low resolution. In a display region where pixels electrically connected to the (I+1)-th-stage shift register unit $G_{I+1}$ to the S-th-stage shift register unit $G_S$ are located, data signals of the rows of pixels may be refreshed by row. Therefore, data signals written to the pixels may be different so that an image displayed in the display region has a relatively high resolution. In a display region where pixels electrically connected to an (S+1)-th-stage shift register unit $G_{S+1}$ to the last-stage shift register unit are located, data signals of three adjacent rows of pixels may be refreshed simultaneously. Therefore, data signals written to three adjacent pixels in the same column may be the same so that an image displayed in the display region has a medium-low resolution. With this arrangement, in the third mode, an image displayed by the display panel may consist of a high-resolution display image, a medium-low-resolution image, and a low-resolution display image. In this case, the region where the high-resolution display image is located may be a region where the human eye focuses, and the region where the medium-low-resolution image is located and the region where the low-resolution display image is located may be other regions outside the focus of the human eye. Therefore, the foveated rendering technology can be implemented for the display panel by controlling the turned-on states of switch units in different phases, thereby contributing to the low power consumption and low cost of the display panel under the premise of improving the display effect of the display panel.

Figure 17:
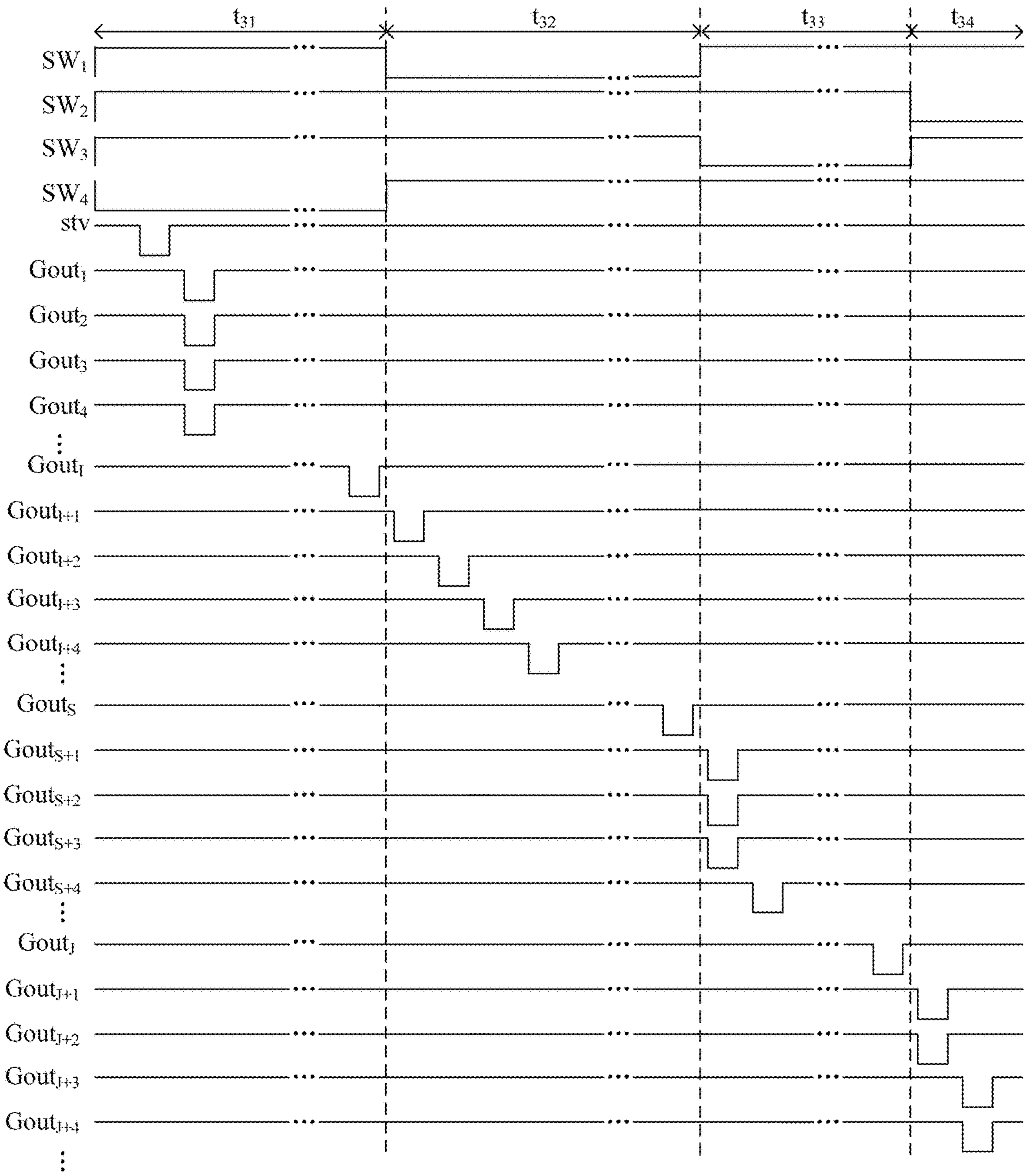
FIG. 17 is another drive timing diagram of the display panel according to an embodiment of the present application.

In another example embodiment, referring to FIGS. 9 and 17, by way of example, X=4. In a fourth mode, the display time of one frame of image of the display panel may include a first phase $t_{31}$, a second phase $t_{32}$, a third phase $t_{33}$, and a fourth phase $t_{34}$. In the first phase $t_{31}$, the fourth switch control signal $SW_4$ is at an effective level and may control the corresponding fourth switch unit $Q_4$ to be turned on, enabling four adjacent shift register units to output effective levels of gate driving signals simultaneously. After the I-th-stage shift register unit $G_I$ outputs the effective level of the gate driving signal $Gout_I$, the second phase $t_{32}$ is entered. The fourth switch control signal $SW_4$ may be controlled to change to be at an ineffective level, and the first switch control signal $SW_1$ may be controlled to change to be at an effective level. Accordingly, the corresponding first switch unit $Q_1$ is turned on. The (I+1)-th-stage shift register unit $G_{I+1}$ to the S-th-stage shift register unit $G_S$ can output effective levels of gate driving signals ($Gout_{I+1}$, $Gout_{I+2}$, $Gout_{I+3}$, $Gout_{I+4}$, . . . , and $Gout_S$) sequentially. After the S-th-stage shift register unit $G_S$ outputs the effective level of the gate driving signal $Gout_S$, the third phase $t_{33}$ may be entered. The first switch control signal $SW_1$ may be controlled to change to be at an ineffective level, and the third switch control signal $SW_3$ may be controlled to change to be at an effective level. Accordingly, the corresponding third switch unit $Q_3$ is turned on. Therefore, from the (S+1)-th-stage shift register unit $G_{S+1}$ to the J-th-stage shift register unit $G_J$, three adjacent shift register units G may output gate driving signals simultaneously. For example, the gate driving signal $Gout_{S+1}$, the gate driving signal $Gout_{S+2}$, and the driving signal $Gout_{S+3}$ are the same. Moreover, the effective level of a gate driving signal $Gout_{S-2}$, the effective level of the gate driving signal $Gout_{S+1}$, and the effective level of the driving signal $Gout_{S+4}$ are shifted sequentially. After the J-th-stage shift register unit $G_J$ outputs the effective level of a gate driving signal $Gout_J$, the fourth phase $t_{34}$ may be entered. The third switch control signal $SW_3$ may be controlled to change to be at an ineffective level, and the second switch control signal $SW_2$ may be controlled to change to be at an effective level. Accordingly, the corresponding second switch unit $Q_2$ is turned on. Therefore, among shift register units starting from a (J+1)-th-stage shift register unit $G_{J+1}$, two adjacent shift register units G may output gate driving signals simultaneously. For example, a gate driving signal $Gout_{J+1}$ is the same as a gate driving signal $Gout_{J+2}$, and a gate driving signal $Gout_{J+3}$ is the same as a gate driving signal $Gout_{J+4}$. In this case, the display panel may include four display regions with different driving manners. In a display region where pixels electrically connected to the first-stage shift register unit $G_1$ to the I-th-stage shift register unit $G_I$ are located, data signals of four adjacent rows of pixels may be refreshed simultaneously. Therefore, data signals written to the four adjacent rows of pixels and in the same column are the same so that an image displayed in the display region has a relatively low resolution. In a display region where pixels electrically connected to the (I+1)-th-stage shift register unit $G_{I+1}$ to the S-th-stage shift register unit $G_S$ are located, data signals of the rows of pixels may be refreshed by row. Therefore, data signals written to the pixels may be different so that an image displayed in the display region has a relatively high resolution. In a display region where pixels electrically connected to an (S+1)-th-stage shift register unit $G_{S+1}$ to the J-th-stage shift register unit $G_J$ are located, data signals of three adjacent rows of pixels may be refreshed simultaneously. Therefore, data signals written to three adjacent pixels in the same column may be the same so that an image displayed in the display region has a medium-low resolution. In a display region where pixels electrically connected to the (J+1)-th-stage shift register unit $G_{J+1}$ to the last-stage shift register unit are located, data signals of two adjacent rows of pixels may be refreshed simultaneously. Therefore, data signals written to two adjacent pixels in the same column may be the same so that an image displayed in the display region has a medium-high resolution. With this arrangement, in the fourth mode, an image displayed by the display panel may include a high-resolution display image, a medium-high-resolution image, a medium-low-resolution image, and a low-resolution display image. In this case, the region where the high-resolution display image is located may be a region where the human eye focuses; and the region where the medium-high-resolution image is located, the region where the medium-low-resolution image is located, and the region where the low-resolution display image is located may be other regions outside the focus of the human eye. Therefore, the foveated rendering technology can be implemented for the display panel by controlling the turned-on states of switch units in different phases, thereby contributing to the low power consumption and low cost of the display panel under the premise of improving the display effect of the display panel.

It is to be noted that technical solutions of embodiments of the present application are illustrated merely by using the preceding example in which X=3 and 4. In embodiments of the present application, X may be any other positive integer greater than 3 and less than or equal to N, which is not specifically limited in embodiments of the present application.

It is to be further noted that an exemplary description is made merely by using the preceding example in which the display time of one frame of image includes one first phase, one second phase, one third phase, and one fourth phase. However, in embodiments of the present application, in any display mode of the display panel, the number of identical phases can be set to one, two, or more according to actual requirements, and the number of different phases may be the same or different. Embodiments of the present application do not enumerate all possibilities here. The number of each phase is not specifically limited in embodiments of the present application under the premise that the core invention points of embodiments of the present application can be achieved.

It is to be understood that display modes of the display panel in embodiments of the present application are merely described above exemplarily. In embodiments of the present application, corresponding switch units turned on in different display modes of the display panel may be set according to actual requirements and combined in any manner. For example, in the second mode, switch units turned on in the first phase and the second phase may be a first switch unit and a second switch unit, respectively; alternatively, switch units turned on in the first phase and the second phase may be a second switch unit and a third switch unit, respectively; alternatively, switch units turned on in the first phase and the second phase may be a third switch unit and a fourth switch unit, respectively. This is not specifically limited in embodiments of the present application under the premise that the core invention points of embodiments of the present application can be achieved.

It is to be understood that the specific structure of a shift register unit in embodiments of the present application may be set according to actual requirements and is not specifically limited in embodiments of the present application under the premise that a shift register unit may control a gate driving signal output by the signal output terminal of the shift register unit according to an input signal received by the signal input terminal of the shift register unit.

Figure 18:
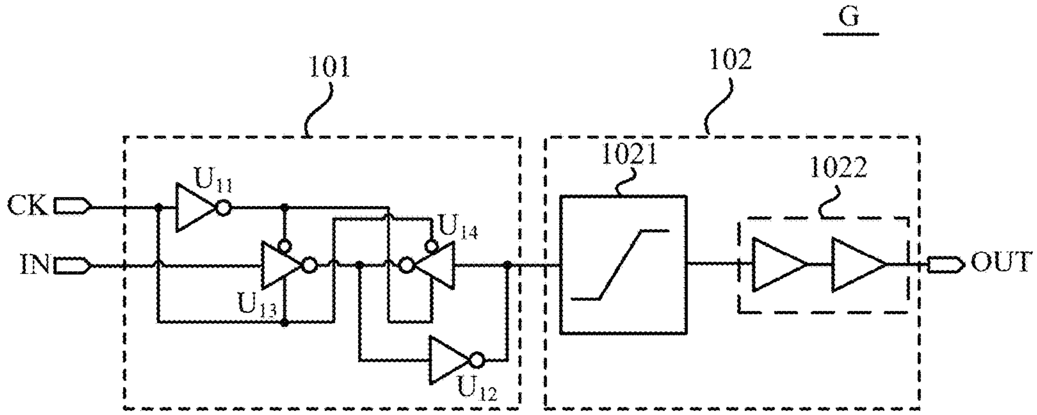
FIG. 18 is a structural diagram of a shift register unit according to an embodiment of the present application.

In an optional embodiment, FIG. 18 is a structural diagram of a shift register unit according to an embodiment of the present application. As shown in FIG. 18, the shift register unit G includes a signal input module 101 and a signal output module 102. In the same shift register unit G, the signal input module 101, at least in response to an input signal of the signal input terminal IN, controls a gate driving signal supplied to the signal output module 102. The signal output module 102 is configured to adjust the polarity and/or amplitude of the gate driving signal and supplies the adjusted gate driving signal to the signal output terminal OUT.

Optionally, the signal input module 101 may be electrically connected to the signal input terminal IN and the signal output module 102. In this case, the signal input module 101 may latch the input signal of the signal input terminal IN and shift the input signal so that the input signal serves as the gate driving signal to be supplied to the signal output module 102. The signal output module 102 may also be electrically connected to the signal output terminal OUT. In this case, the signal output module 102 may simultaneously adjust both the amplitude and polarity of the gate driving signal received by the signal output module 102. Alternatively, the signal output module 102 adjusts only one of the polarity or amplitude of the gate driving signal received by the signal output module 102 and then outputs the gate driving signal to the signal output terminal OUT. Such an arrangement guarantees that the gate driving signal can control a transistor in a corresponding pixel to be turned on or off accurately.

The polarity of the gate driving signal output by the signal output terminal OUT is related to the size and type of the transistor in the pixel. For the case where the transistor in the pixel is an n-type transistor, when the gate driving signal output by the signal output terminal OUT is of positive polarity, that is, when the gate driving signal is at an effective level, it can control the transistor in the pixel to be turned on; when the gate driving signal output by the signal output terminal OUT is of negative polarity, that is, when the gate driving signal is at an ineffective level, it can control the transistor in the pixel to be turned off. On the contrary, for the case where the transistor in the pixel is a p-type transistor, when the gate driving signal output by the signal output terminal OUT is of negative polarity, it can control the transistor in the pixel to be turned on; when the gate driving signal output by the signal output terminal OUT is of positive polarity, it can control the transistor in the pixel to be turned off.

In an example embodiment, the signal input module 101 may include a latch. An input terminal of the latch may be electrically connected to the signal input terminal IN. A clock terminal of the latch may be electrically connected to a clock signal terminal CK. An output terminal of the latch may be electrically connected to the signal output module 102. With this arrangement, the latch may latch the input signal of the signal input terminal IN based on a clock signal of the clock signal terminal CK, shift the latched signal, and output the gate driving signal to the signal output module 102.

The latch of the signal input module 101 may include a first inverter Un, a second inverter $U_{12}$, a first tri-state gate $U_{13}$, and a second tri-state gate $U_{14}$. An input terminal of the first inverter $U_{11}$ is electrically connected to the clock signal terminal CK and is further electrically connected to a negative signal control terminal of the first tri-state gate $U_{13}$ and a positive signal control terminal of the second tri-state gate $U_{14}$. An output terminal of the first inverter $U_{11}$ is electrically connected to a positive signal control terminal of the first tri-state gate $U_{13}$ and a negative signal control terminal of the second tri-state gate $U_{14}$. An input terminal of the first tri-state gate $U_{13}$ is electrically connected to the signal input terminal IN. An output terminal of the first tri-state gate $U_{14}$ is electrically connected to an input terminal of the second inverter $U_{12}$. An output terminal of the second inverter $U_{12}$ is electrically connected to an input terminal of the second tri-state gate $U_{14}$. An output terminal of the second tri-state gate $U_{14}$ is electrically connected to the input terminal of the second inverter $U_{12}$. The output terminal of the second inverter $U_{12}$ is the output terminal of the latch. With this arrangement, the signal input module 101 includes inverters and tri-state gates so that the signal input module 101 can respond to the input signal of the signal input terminal IN and the clock signal of the clock signal terminal CK to output the gate driving signal to the signal output module 102.

Optionally, by way of example, the signal output module 102 can perform polarity adjustment and amplitude adjustment on the gate driving signal simultaneously. As shown in FIG. 18, the signal output module 102 may include a level conversion unit 1021 and a polarity conversion unit 1022. The level conversion unit 1021 may perform level conversion on the gate driving signal output by the signal input module 101 to adjust the amplitude of the gate driving signal. The gate driving signal whose level has been conversed by the level conversion unit 1021 can be supplied to the polarity conversion unit 1022 so that the polarity conversion unit 1022 can perform polarity adjustment on the gate driving signal whose level has been conversed by the level conversion unit 1021. The gate driving signal whose polarity has been conversed by the polarity conversion unit 1022 may be output by the signal output terminal OUT to control the transistor in the pixel to be turned on or off.

It is to be noted that the structure of the signal output module 102 is merely described above exemplarily. In embodiments of the present application, the signal output module 102 may also include only a level conversion unit or a polarity conversion unit. The structure of the signal output module 102 is not specifically limited in embodiments of the present application under the premise that the core invention points of embodiments of the present application can be achieved.

In an optional embodiment, when the signal output module 102 includes a polarity conversion unit 1022, the polarity conversion unit 1022 may include a buffer. The buffer may include one or more inverters. The number of inverters in the buffer may be set according to actual requirements and is not specifically limited in embodiments of the present application.

Figure 19:
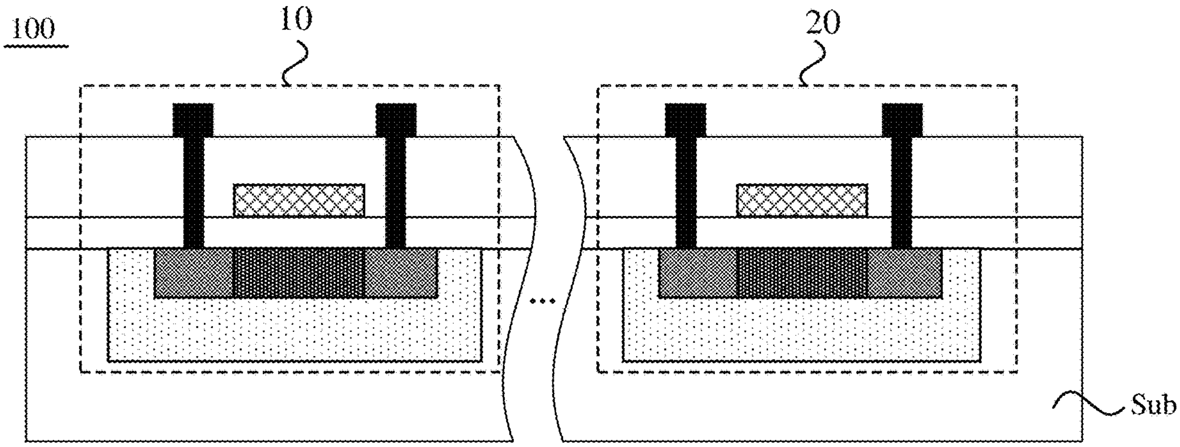
FIG. 19 is a diagram of a layer structure of the display panel according to an embodiment of the present application.

On the basis of the preceding embodiments, FIG. 19 is a diagram of a layer structure of the display panel according to an embodiment of the present application. As shown in FIG. 19, the display panel 100 further includes a silicon-based substrate Sub. In this case, the driver circuit 10 and the pixels 20 are disposed on the silicon-based substrate Sub.

The silicon-based substrate Sub in the display panel 100 may include multiple substrate regions for accommodating circuit structures with different load-bearing capacities. For example, when transmission signals of components in the driver circuit 10 differ from transmission signals of components in the pixels 20, a substrate region for accommodating the components in the driver circuit 10 may be different from a substrate region for accommodating the components in the pixels 20. Such an arrangement guarantees that the display panel 100 has a relatively low cost under the premise of meeting the load-bearing requirements of the components.

It is important to note that both a pixel and the driver circuit may include at least one of an active component or a passive component, which is not specifically limited in embodiments of the present application. For ease of illustrating the drawings, embodiments of the present application merely exemplify the structure in which each of the pixel and the driver circuit is represented by a transistor. The actual structure of the driver circuit and the actual structure of the pixel are not limited to this and may be designed according to actual requirements.

In an optional embodiment, a transistor in the driver circuit and a transistor in the pixel may be prepared in the same process to simplify the preparation process steps of the display panel, enhance the production rate of the display panel, and reduce the preparation cost of the display panel.

Based on the same inventive concept, an embodiment of the present application further provides a display device. The display device includes the display panel provided in any embodiment of the present application. Therefore, the display device provided in the embodiment of the present application has the technical features of the display panel provided in embodiments of the present application and can achieve the beneficial effects of the display panel provided in embodiments of the present application. For the same part, reference may be to the preceding description of the display panel provided in embodiments of the present application, which is not repeated herein.

Figure 20:
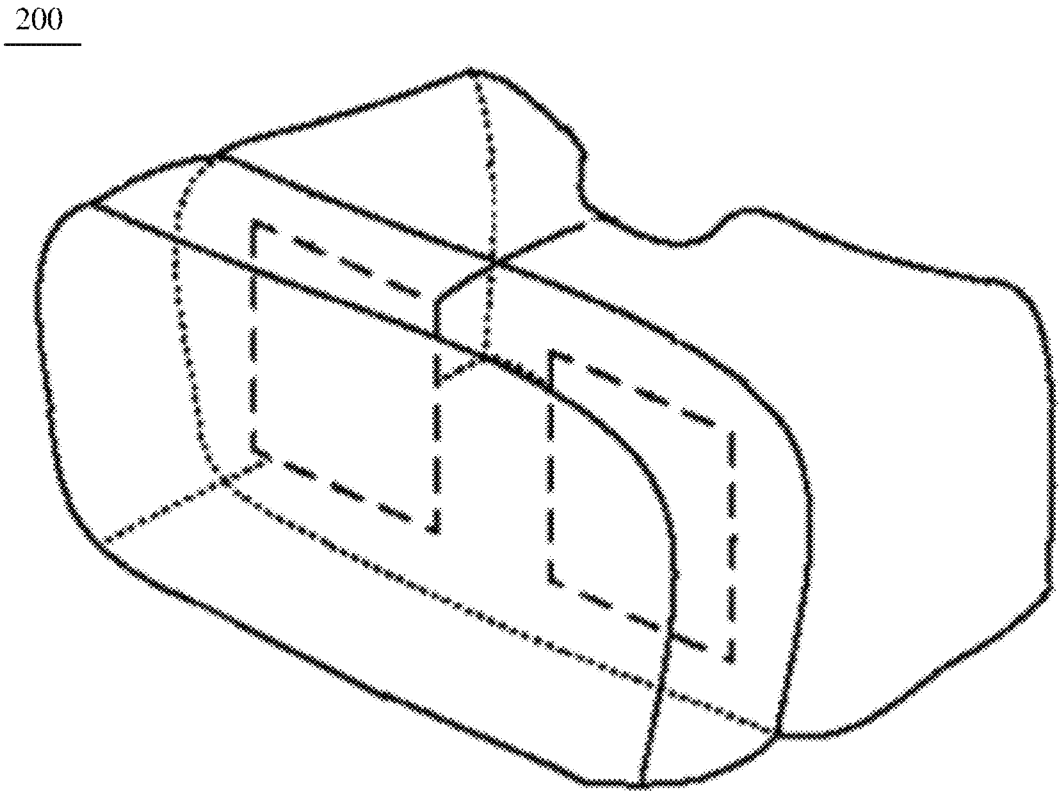
FIG. 20 is a structural diagram of a display device according to an embodiment of the present application.

Optionally, FIG. 20 is a structural diagram of a display device according to an embodiment of the present application. As shown in FIG. 20, the display device may be a near-eye display device 200. The near-eye display device 200 may be a smart glasses based on VR or AR and can create a virtual image in a monocular or binocular field of view. Through a display panel placed within the non-clear viewing distance of the human eye, the display device 200 renders light field information to the human eye, thereby creating a virtual scene in front of the human eye.

It is to be noted that the preceding are preferred embodiments of the present application and technical principles used therein. It is to be understood by those skilled in the art that the present application is not limited to the embodiments described herein. For those skilled in the art, various apparent modifications, adaptations, and substitutions can be made without departing from the scope of the present application. Therefore, though the present application is described in detail through the preceding embodiments, the present application is not limited to the preceding embodiments and may include other equivalent embodiments without departing from the concept of the present application. The scope of the present application is determined by the scope of the appended claims.

What is claimed is:

1. A display panel, comprising a plurality of pixels arranged in an array and a driver circuit, wherein, the driver circuit comprises a plurality of shift register units connected in cascade and a plurality of switch modules, each of the plurality of switch modules is electrically connected to a respective one of shift register units other than a first-stage shift register unit, and a signal output terminal of each shift register unit of the plurality of shift register units is connected to a respective row of pixels among the plurality of pixels;

among the plurality of switch modules, each switch module comprises N switch units from a first switch unit to an N-th switch unit; and N switch units of one switch module are turned on in a time-sharing manner; wherein N is a positive integer greater than or equal to 2; and among the plurality of shift register units, a signal input terminal of the first-stage shift register unit is electrically connected to a start control signal terminal; and for each shift register unit of the shift register units other than the first-stage shift register unit, a signal input terminal of the shift register unit is electrically connected to switch output terminals of N switch units of a respective switch module;

among first N-stage shift register units, a signal input terminal of an M-th-stage shift register unit is electrically connected to the start control signal terminal through any one of an M-th switch unit to an N-th switch unit of a switch module corresponding to the M-th-stage shift register unit; and the signal input terminal of the M-th-stage shift register unit is electrically connected to a signal output terminal of at least one of the first-stage shift register unit to an (M−1)-th-stage shift register unit through a first switch unit to an (M−1)-th switch unit of the switch module corresponding to the M-th-stage shift register unit; wherein M is a positive integer greater than 1 and less than or equal to N; and a signal input terminal of an (I+N)-th-stage shift register unit is electrically connected to a signal output terminal of at least one of an I-th-stage shift register unit to an (I+N−1)-th-stage shift register unit through the N switch units of a switching module corresponding to the (I+N)-th-stage shift register unit, wherein I is a positive integer greater than 1.

2. The display panel according to claim 1, wherein a signal input terminal of a J-th-stage shift register unit is electrically connected to a signal output terminal of an S-th-stage shift register unit through a K-th switch unit in a switch module corresponding to the J-th-stage shift register unit, wherein J, K, and S are each a positive integer; J>S; J>K; and K≤N; wherein when J/K≠[J/K], S=[J/K]*K; or when J/K=[J/K], S=(J/K−1)*K.

3. The display panel according to claim 2, wherein K-th switch units are connected in parallel to a signal output terminal of one shift register unit among the plurality of shift register units, wherein the K-th switch units are in different switch modules and are electrically connected to the signal output terminal of the one shift register unit.

4. The display panel according to claim 2, wherein K-th switch units are connected in series to a signal output terminal of one shift register unit among the plurality of shift register units, wherein the K-th switch units are in different switch modules and are electrically connected to the signal output terminal of the one shift register unit.

5. The display panel according to claim 1, wherein, a switch unit of the one switch module comprises a switch transistor; and a first electrode of the switch transistor is a switch input terminal of the switch unit, a second electrode of the switch transistor is a switch output terminal of the switch unit, and a gate of the switch transistor is configured to receive a switch control signal; and switch transistors of the one switch module are configured to receive different switch control signals.

6. The display panel according to claim 5, further comprising N switch signal transmission lines for transmitting switch control signals, wherein, gates of the switch transistors of the one switch module are correspondingly electrically connected to different switch signal transmission lines among the N switch signal transmission lines; and gates of switch transistors of K-th switch units are electrically connected to one switch signal transmission line among the N switch signal transmission lines, wherein K≤N, and K is a positive integer; and the K-th switch units are in different switch modules and are electrically connected to the shift register units other than the first-stage shift register unit.

7. The display panel according to claim 1, wherein a shift register unit among the plurality of shift register units comprises a signal input module and a signal output module; and for one shift register unit among the plurality of shift register units, a signal input module of the one shift register unit is configured to, at least in response to an input signal of a signal input terminal of the one shift register unit, control a gate driving signal supplied to a signal output module of the one shift register unit; and the signal output module is configured to adjust at least one of polarity and amplitude of the gate driving signal and supply the adjusted gate driving signal to a signal output terminal of the one shift register unit.

8. The display panel according to claim 1, wherein a display mode of the display panel comprises a first display mode; and one switch unit from the first switch unit to the N-th switch unit is controlled to be turned on within display time of one frame in the first display mode.

9. The display panel according to claim 1, wherein a display mode of the display panel comprises a second display mode; and display time of one frame in the second display mode comprises at least one first phase and at least one second phase, each switch unit from the first switch unit to the N-th switch unit is controlled to be turned on in a respective one of the at least one first phase and the at least one second phase, and a switch unit turned on in one of the at least one first phase is different from a switch unit turned on in one of the at least one second phase.

10. The display panel according to claim 1, wherein a display mode of the display panel comprises an X-th display mode; and display time of one frame in the X-th display mode comprises phases from at least one first phase to at least one X-th phase; each switch unit from the first switch unit to the N-th switch unit is controlled to be turned on in a respective phase from the at least one first phase to the at least one X-th phase; and switch units turned on in different phases from the at least one first phase to the at least one X-th phase are different; wherein X is a positive integer greater than or equal to 3.

11. The display panel according to claim 1, further comprising:

a silicon-based substrate, wherein the driver circuit and the plurality of pixels are disposed on the silicon-based substrate.

* * * * *